US010912088B2

(12) United States Patent
Katar et al.

(10) Patent No.: US 10,912,088 B2
(45) Date of Patent: Feb. 2, 2021

(54) BAND PREFERENCE IN WIRELESS NETWORKS

(71) Applicant: QUALCOMM Incorporated, San Diego, CA (US)

(72) Inventors: Srinivas Katar, Fremont, CA (US); Amod Bodas, Cupertino, CA (US); Ramaswamy Venkateshwaran, Dublin, CA (US); Farrukh Usmani, Carlsbad, CA (US); Ravi Gidvani, Fremont, CA (US); Hang Su, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/994,798

(22) Filed: May 31, 2018

(65) Prior Publication Data

US 2018/0295624 A1    Oct. 11, 2018

Related U.S. Application Data

(63) Continuation of application No. 15/009,738, filed on Jan. 28, 2016, now Pat. No. 9,992,775.
(Continued)

(51) Int. Cl.
*H04W 72/04* (2009.01)
*H04W 76/10* (2018.01)
(Continued)

(52) U.S. Cl.
CPC ......... *H04W 72/0453* (2013.01); *H04W 8/02* (2013.01); *H04W 48/16* (2013.01); *H04W 76/10* (2018.02)

(58) Field of Classification Search
CPC ........ H04B 1/006; H04B 1/44; H04B 17/318; H04L 5/006; H04W 8/02; H04W 16/14;
(Continued)

(56) References Cited

U.S. PATENT DOCUMENTS 6,957,053 B1   10/2005   Moers
7,280,525 B2   10/2007   Koo
(Continued)

FOREIGN PATENT DOCUMENTS

EP   1675427 A1   6/2006
EP   1947883 A1   7/2008
(Continued)

OTHER PUBLICATIONS

International Preliminary Report on Patentability—PCT/US2016/015642, International Search Authority—European Patent Office, dated Aug. 1, 2017.
(Continued)

*Primary Examiner* — Eric Nowlin
(74) *Attorney, Agent, or Firm* — Holland & Hart LLP/Qualcomm

(57) ABSTRACT

Method, systems, and apparatuses are described for wireless communications. More particularly, a wireless station may connect to a wireless network using a first radio frequency (RF) band and detect a signal strength of the first RF band is greater than a roaming threshold. The wireless station may perform a plurality of scans for support by the wireless network of a second RF band in response to the detected signal strength. Each scan may occur when the signal strength of the first RF band is greater than the roaming threshold. The wireless station may selectively connect to the wireless network using the second RF band based at least in part on the scanning and a throughput supported by the wireless network over the second RF band. The first RF band may be a 2.4 GHz band and the second RF band may be a 5 GHz band.

27 Claims, 11 Drawing Sheets

Related U.S. Application Data

(60) Provisional application No. 62/109,827, filed on Jan. 30, 2015.

(51) Int. Cl.
  *H04W 48/16* (2009.01)
  *H04W 8/02* (2009.01)

(58) Field of Classification Search
  CPC . H04W 24/02; H04W 36/0083; H04W 36/08; H04W 36/30; H04W 48/16; H04W 72/0453; H04W 76/02; H04W 84/12; H04W 88/08
  See application file for complete search history.

(56) References Cited

U.S. PATENT DOCUMENTS

| | | | |
|---|---|---|---|
| 7,430,420 B2 | 9/2008 | Derakhshan et al. | |
| 7,577,453 B2 | 8/2009 | Matta | |
| 7,599,693 B2 | 10/2009 | Kuriyama | |
| 8,064,398 B2* | 11/2011 | Agashe | H04W 36/30 370/331 |
| 8,064,939 B2 | 11/2011 | Matta | |
| 8,170,561 B2 | 5/2012 | Makabe | |
| 8,200,169 B2 | 6/2012 | Fujii et al. | |
| 8,259,675 B2 | 9/2012 | Tamura et al. | |
| 8,467,784 B2 | 6/2013 | Balasubramanian et al. | |
| 8,472,961 B2 | 6/2013 | Makabe | |
| 8,564,381 B2 | 10/2013 | McKinzie | |
| 8,594,692 B2 | 11/2013 | Kimura | |
| 8,654,741 B2 | 2/2014 | Lundsgaard et al. | |
| 8,676,221 B2 | 3/2014 | Nagaraja | |
| 8,712,467 B2 | 4/2014 | Clark et al. | |
| 8,774,335 B2 | 7/2014 | Abdelmonem et al. | |
| 8,798,073 B2 | 8/2014 | Lim et al. | |
| 8,902,866 B2 | 12/2014 | Laroia et al. | |
| 9,014,751 B1 | 4/2015 | Choi et al. | |
| 9,026,099 B2* | 5/2015 | Chhabra | H04W 48/16 455/418 |
| 9,166,763 B2 | 10/2015 | Sagae et al. | |
| 9,233,472 B2 | 1/2016 | Angle et al. | |
| 9,281,864 B2 | 3/2016 | Abdelmonem et al. | |
| 9,307,474 B1 | 4/2016 | Tailor et al. | |
| 9,338,784 B2 | 5/2016 | Clark et al. | |
| 9,344,978 B2 | 5/2016 | Jeong et al. | |
| 9,357,526 B2 | 5/2016 | Baek et al. | |
| 9,402,217 B1* | 7/2016 | Khan | H04W 36/22 |
| 9,420,523 B2* | 8/2016 | Damji | H04W 36/0085 |
| 9,432,848 B2* | 8/2016 | Iyer | H04L 63/1466 |
| 9,497,696 B2 | 11/2016 | Yuk et al. | |
| 9,516,672 B2 | 12/2016 | Bhanage et al. | |
| 9,554,287 B2 | 1/2017 | Beale | |
| 9,756,611 B2 | 9/2017 | Yavuz et al. | |
| 9,967,884 B2* | 5/2018 | Emmanuel | H04W 24/08 |
| 9,986,492 B2* | 5/2018 | Katar | H04W 48/16 |
| 9,992,733 B2* | 6/2018 | Kasten | H04W 48/16 |
| 10,020,926 B2* | 7/2018 | Iyer | H04W 72/085 |
| 10,038,995 B2* | 7/2018 | Katar | H04W 24/10 |
| 10,098,115 B2* | 10/2018 | Hara | H04W 72/0453 |
| 10,349,325 B2* | 7/2019 | Ouzieli | H04W 36/0083 |
| 10,462,681 B2* | 10/2019 | Guha | H04W 72/0406 |
| 10,516,456 B1 | 12/2019 | Fuleshwar Prasad | H04B 1/006 |
| 10,652,892 B2* | 5/2020 | Liu | H04W 48/18 |
| 2006/0014537 A1 | 1/2006 | Arai et al. | |
| 2006/0073827 A1 | 4/2006 | Vaisanen et al. | |
| 2006/0142032 A1 | 6/2006 | Derakhshan et al. | |
| 2006/0160551 A1 | 7/2006 | Matoba et al. | |
| 2006/0252428 A1* | 11/2006 | Agashe | H04W 36/30 455/436 |
| 2007/0142046 A1 | 6/2007 | Welnick | |
| 2008/0159234 A1* | 7/2008 | Prakash | H04W 48/12 370/332 |
| 2008/0176571 A1 | 7/2008 | Choi | |
| 2008/0207239 A1 | 8/2008 | Fujii et al. | |
| 2008/0298450 A1 | 12/2008 | Zhang et al. | |
| 2008/0320354 A1 | 12/2008 | Doppler et al. | |
| 2009/0232098 A1 | 9/2009 | Makabe | |
| 2010/0027492 A1 | 2/2010 | Asanuma | |
| 2010/0208687 A1 | 8/2010 | Lim et al. | |
| 2010/0316002 A1 | 12/2010 | Nagaraja | |
| 2011/0051693 A1 | 3/2011 | Hsu et al. | |
| 2011/0218007 A1 | 9/2011 | Kimura | |
| 2011/0269502 A1 | 11/2011 | Clark et al. | |
| 2011/0319085 A1 | 12/2011 | Ishii et al. | |
| 2012/0190401 A1 | 7/2012 | Makabe | |
| 2012/0243474 A1* | 9/2012 | Iyer | H04L 63/1466 370/328 |
| 2013/0039181 A1 | 2/2013 | Chao | |
| 2013/0136018 A1 | 5/2013 | Jeong et al. | |
| 2013/0150012 A1* | 6/2013 | Chhabra | H04W 48/16 455/418 |
| 2013/0259005 A1 | 10/2013 | Kulkarni | |
| 2013/0329592 A1 | 12/2013 | Beale | |
| 2014/0059218 A1 | 2/2014 | Ganu et al. | |
| 2014/0073319 A1* | 3/2014 | Navalgund | H04W 28/00 455/432.1 |
| 2014/0148170 A1* | 5/2014 | Damji | H04W 36/0085 455/437 |
| 2014/0153497 A1 | 6/2014 | Brisebois et al. | |
| 2014/0207282 A1 | 7/2014 | Angle et al. | |
| 2014/0228072 A1 | 8/2014 | Clark et al. | |
| 2014/0256342 A1 | 9/2014 | Abdelmonem et al. | |
| 2014/0286201 A1 | 9/2014 | Sagae et al. | |
| 2014/0307657 A1 | 10/2014 | Baek et al. | |
| 2015/0024738 A1 | 1/2015 | Anderson et al. | |
| 2015/0071275 A1 | 3/2015 | Yuk et al. | |
| 2015/0139015 A1 | 5/2015 | Kadous et al. | |
| 2015/0146645 A1 | 5/2015 | Sergeyev et al. | |
| 2015/0208416 A1* | 7/2015 | Chandra | H04W 88/06 370/329 |
| 2015/0264614 A1* | 9/2015 | Stager | H04W 36/0061 370/332 |
| 2015/0312928 A1 | 10/2015 | Kwon et al. | |
| 2015/0350873 A1 | 12/2015 | Choi et al. | |
| 2015/0350993 A1* | 12/2015 | Kasten | H04W 48/16 370/332 |
| 2015/0382348 A1* | 12/2015 | Hara | H04W 72/0453 370/329 |
| 2016/0029248 A1 | 1/2016 | Syed et al. | |
| 2016/0088640 A1* | 3/2016 | Huang | H04W 76/18 370/329 |
| 2016/0127956 A1* | 5/2016 | Jujaray | H04W 48/16 455/437 |
| 2016/0167234 A1 | 6/2016 | Angle et al. | |
| 2016/0227544 A1 | 8/2016 | Katar et al. | |
| 2016/0255511 A1 | 9/2016 | Jeong et al. | |
| 2016/0255549 A1 | 9/2016 | Lakhdhar et al. | |
| 2016/0277042 A1 | 9/2016 | He | |
| 2016/0286541 A1 | 9/2016 | Webb et al. | |
| 2016/0295568 A1 | 10/2016 | Webb et al. | |
| 2016/0353301 A1 | 12/2016 | Kim | |
| 2017/0013624 A1 | 1/2017 | Hashimoto | |
| 2017/0041108 A1 | 2/2017 | Iyer | |
| 2017/0064536 A1* | 3/2017 | Katar | H04W 8/02 |
| 2017/0064618 A1* | 3/2017 | Katar | H04W 48/16 |
| 2017/0086197 A1 | 3/2017 | Palamara et al. | |
| 2017/0135104 A1* | 5/2017 | Emmanuel | H04W 24/06 |
| 2017/0142725 A1* | 5/2017 | Mohaupt | H04W 72/0453 |
| 2017/0155421 A1 | 6/2017 | Wloczysiak | |
| 2017/0163401 A1 | 6/2017 | McNamara et al. | |
| 2017/0201997 A1 | 7/2017 | Cheng et al. | |
| 2017/0230950 A1* | 8/2017 | Zhang | H04B 7/0617 |
| 2017/0279564 A1 | 9/2017 | Nord et al. | |
| 2018/0027489 A1 | 1/2018 | Buckley et al. | |
| 2018/0041909 A1 | 2/2018 | Fukui et al. | |
| 2018/0110061 A1* | 4/2018 | Chen | H04W 72/082 |
| 2018/0176284 A1* | 6/2018 | Strater | H04B 17/318 |
| 2018/0184346 A1* | 6/2018 | Wang | H04W 36/08 |
| 2018/0295527 A1* | 10/2018 | Guha | H04W 72/0406 |
| 2018/0309525 A1* | 10/2018 | Peng | H04B 7/0608 |
| 2018/0352497 A1* | 12/2018 | Taskin | H04W 36/00 |
| 2019/0075469 A1* | 3/2019 | Mahoney | H04W 16/12 |

(56) References Cited

U.S. PATENT DOCUMENTS

2019/0149181 A1* 5/2019 Tsai ................... H04B 17/318
2019/0268823 A1* 8/2019 Gokturk ................ H04W 48/20
2019/0313313 A1* 10/2019 Zheng ................. H04W 36/24
2019/0364566 A1* 11/2019 Husted .............. H04W 72/0453
2019/0394722 A1* 12/2019 Gupta ................. H04W 40/12

FOREIGN PATENT DOCUMENTS

| EP | 1983676 A1 | 10/2008 | | |
|---|---|---|---|---|
| EP | 2515585 A1 | 10/2012 | | |
| EP | 2613592 A1 | 7/2013 | | |
| EP | 3334230 A1 * | 6/2018 | ........ | H04W 72/0453 |
| WO | WO03094540 A1 | 11/2003 | | |
| WO | WO2008130781 A1 | 10/2008 | | |
| WO | WO2013085610 A1 | 6/2013 | | |
| WO | WO-2018108701 A1 * | 6/2018 | ........ | H04W 72/0453 |

OTHER PUBLICATIONS

International Search Report and Written Opinion—PCT/US2016/015642—ISA/EPO—dated Apr. 22, 2016.

* cited by examiner

BAND PREFERENCE IN WIRELESS NETWORKS

CROSS REFERENCES

The present application for patent is a continuation of U.S. patent application Ser. No. 15/009,738 by Katar et al., entitled "Band Preference in Wireless Networks", filed Jan. 28, 2016 and claims priority to U.S. Provisional Patent Application No. 62/109,827 by Katar et al., entitled "Band Preference in Wireless Networks," filed Jan. 30, 2015, assigned to the assignee hereof, and expressly incorporated by reference herein.

BACKGROUND

Field of the Disclosure

The present disclosure relates to wireless communication systems, and more particularly to providing a band preference in a wireless network.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (or communicate with other devices coupled to the access point).

Some wireless networks support more than one RF band, e.g., a 2.4 GHz band and a 5 GHz band. Different RF bands may have different RF characteristics and provide different operational capacities. For example, the 5 GHz RF band supported by some wireless networks typically provides higher bandwidth capacity and support for more channel modes than the 2.4 GHz RF band, but the 5 GHz wireless band generally has a reduced coverage area.

When connecting to a network, a STA may enter the coverage area of the wireless network and connect to the wireless network over the first detected band, e.g., the 2.4 GHz band, having a measured signal strength above a joining threshold. The STA may continue to scan for service on other RF bands, e.g., the 5 GHz band, or wireless networks until the signal strength of the current band reaches a higher roaming threshold level, at which point the STA may stop scanning for other RF bands to conserve power. According to current implementations, a STA connected to the 2.4 GHz band of a wireless network that reaches the roaming threshold will stick to the 2.4 GHz band rather than continue to look for a 5 GHz band that may be more favorable. As the STA moves closer to the AP of the wireless network, the signal strength of the 5 GHz band may increase to a point where the 5 GHz band would otherwise provide greater connection capabilities to the STA than the 2.4 GHz band. There are, however, no mechanisms that permit the STA to perform additional scans to detect a more preferential RF band when the RF band of the current connection provides a signal strength above the roaming threshold.

SUMMARY

The present description generally relates to one or more improved systems, methods, apparatuses, or computer-readable media for wireless communications. More particularly, the described features relate to techniques for a STA to adaptively or dynamically trigger for scans for a preferred RF band of a wireless network when the signal strength of a current band is higher than a roaming threshold. A STA may enter the coverage area of a first RF band, e.g., a 2.4 GHz band, of a wireless network and connect to the wireless network using the first RF band. The STA may determine that the signal strength of the first RF band has reached and is greater than a roaming threshold level.

While the signal strength of the first RF band is greater than the roaming threshold, the STA may identify or determine that a trigger condition associated with performing additional scans for a preferred RF band, e.g., a 5 GHz band, has been reached. Accordingly, the STA may scan the wireless network to determine if the second RF band is supported. The STA may perform multiple scans for the second RF band while the signal strength of the first RF band is greater than the roaming threshold. If the STA determines that the second RF band is supported, the STA may selectively connect to the wireless network using the second RF band. For example, the STA may connect using the second RF band if a detected signal strength of the second RF band is at or above a threshold level. In one example, the STA may connect to the second RF band of the wireless network when the measured signal strength of the second RF band would provide an improved connection capability, capacity, etc., with respect to the first RF band.

A method for wireless communication at a wireless station is described. The method may include: connecting to a wireless network using a first radio frequency (RF) band; detecting a signal strength of the wireless network over the first RF band that is greater than a roaming threshold; performing a plurality of scans for support by the wireless network of a second RF band in response to the detected signal strength, each scan occurring when the signal strength of the first RF band is greater than the roaming threshold; and selectively connecting to the wireless network using the second RF band in response to the scanning.

The method may include performing each scan based at least in part on an instantaneous signal strength of the wireless network over the first RF band. The method may include performing each scan based at least in part on a detected threshold change of the signal strength of the wireless network over the first RF band. The method may include limiting a number of the plurality of scans based at least in part on a scan count constraint parameter while the detected signal strength of the wireless network over the first RF band is greater than the roaming threshold. The method may include performing one of the plurality of scans based at least in part on a defined scan delay period between subsequent scans.

The method may include: identifying an upper signal strength level of the wireless network over the first RF band; and refraining from scanning for support by the wireless network of the second RF band when the detected signal strength is greater than the upper signal strength level. The method may include: determining that the second RF band is unsupported by the wireless network; and refraining from scanning on the second RF band while the signal strength of the wireless network over the first RF band is greater than the roaming threshold.

The method may include: determining that the second RF band is supported by the wireless network; and determining a supported throughput of the wireless network over the second RF band; wherein selectively connecting to the wireless network using the second RF band is further based at least in part on the supported throughput of the second RF band. The throughput of the wireless network over the second RF band may be determined based at least in part on a detected signal strength of the second RF band. The first RF band may be a 2.4 GHz RF band and the second RF band may be a 5 GHz RF band.

An apparatus for wireless communication at a wireless station is described. The apparatus may include: a connection controller to connect to a wireless network using a first radio frequency (RF) band; a signal strength detector to detect a signal strength of the wireless network over the first RF band that is greater than a roaming threshold; and a scanning controller perform a plurality of scans for support by the wireless network of a second RF band in response to the detected signal strength, each scan occurring when the signal strength of the first RF band is greater than the roaming threshold; wherein the connection controller is further to selectively connect to the wireless network using the second RF band in response to the scanning.

The scanning controller is further to perform each scan based at least in part on an instantaneous signal strength of the wireless network over the first RF band. The scanning controller is further to perform each scan based at least in part on a detected threshold change of the signal strength of the wireless network over the first RF band. The scanning controller is further to limit a number of the plurality of scans based at least in part on a scan count constraint parameter while the detected signal strength of the wireless network over the first RF band is greater than the roaming threshold.

The scanning controller is further to perform one of the plurality of scans based at least in part on a defined scan delay period between subsequent scans. The signal strength detector is further to identify an upper signal strength level of the wireless network over the first RF band; and the scanning controller is further to refrain from scanning for support by the wireless network of the second RF band when the detected signal strength is greater than the upper signal strength level. The scanning controller is further to determine that the second RF band is unsupported by the wireless network; and refraining from scanning on the second RF band while the signal strength of the wireless network over the first RF band is greater than the roaming threshold.

The scanning controller is further to determine that the second RF band is supported by the wireless network, and for determining a supported throughput of the wireless network over the second RF band, wherein selectively connecting to the wireless network using the second RF band is further based at least in part on the supported throughput of the second RF band. The throughput of the wireless network over the second RF band may be determined based at least in part on a detected signal strength of the second RF band. The first RF band may be a 2.4 GHz RF band and the second RF band may be a 5 GHz RF band.

An apparatus for wireless communication at a wireless station is described. The apparatus may include: means for connecting to a wireless network using a first radio frequency (RF) band; means for detecting a signal strength of the wireless network over the first RF band that is greater than a roaming threshold; means for performing a plurality of scans for support by the wireless network of a second RF band in response to the detected signal strength, each scan occurring when the signal strength of the first RF band is greater than the roaming threshold; and means for selectively connecting to the wireless network using the second RF band in response to the scanning.

The apparatus may include means for performing each scan based at least in part on an instantaneous signal strength of the wireless network over the first RF band. The apparatus may include means for performing each scan based at least in part on a detected threshold change of the signal strength of the wireless network over the first RF band. The apparatus may include means for limiting a number of the plurality of scans based at least in part on a scan count constraint parameter while the detected signal strength of the wireless network over the first RF band is greater than the roaming threshold. The apparatus may include means for performing one of the plurality of scans based at least in part on a defined scan delay period between subsequent scans.

A non-transitory computer-readable medium storing computer-executable code for wireless communications is described. The code executable by a processor to: connect to a wireless network using a first radio frequency (RF) band; detect a signal strength of the wireless network over the first RF band that is greater than a roaming threshold; perform a plurality of scans for support by the wireless network of a second RF band in response to the detected signal strength, each scan occurring when the signal strength of the first RF band is greater than the roaming threshold; and selectively connect to the wireless network using the second RF band in response to the scanning.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
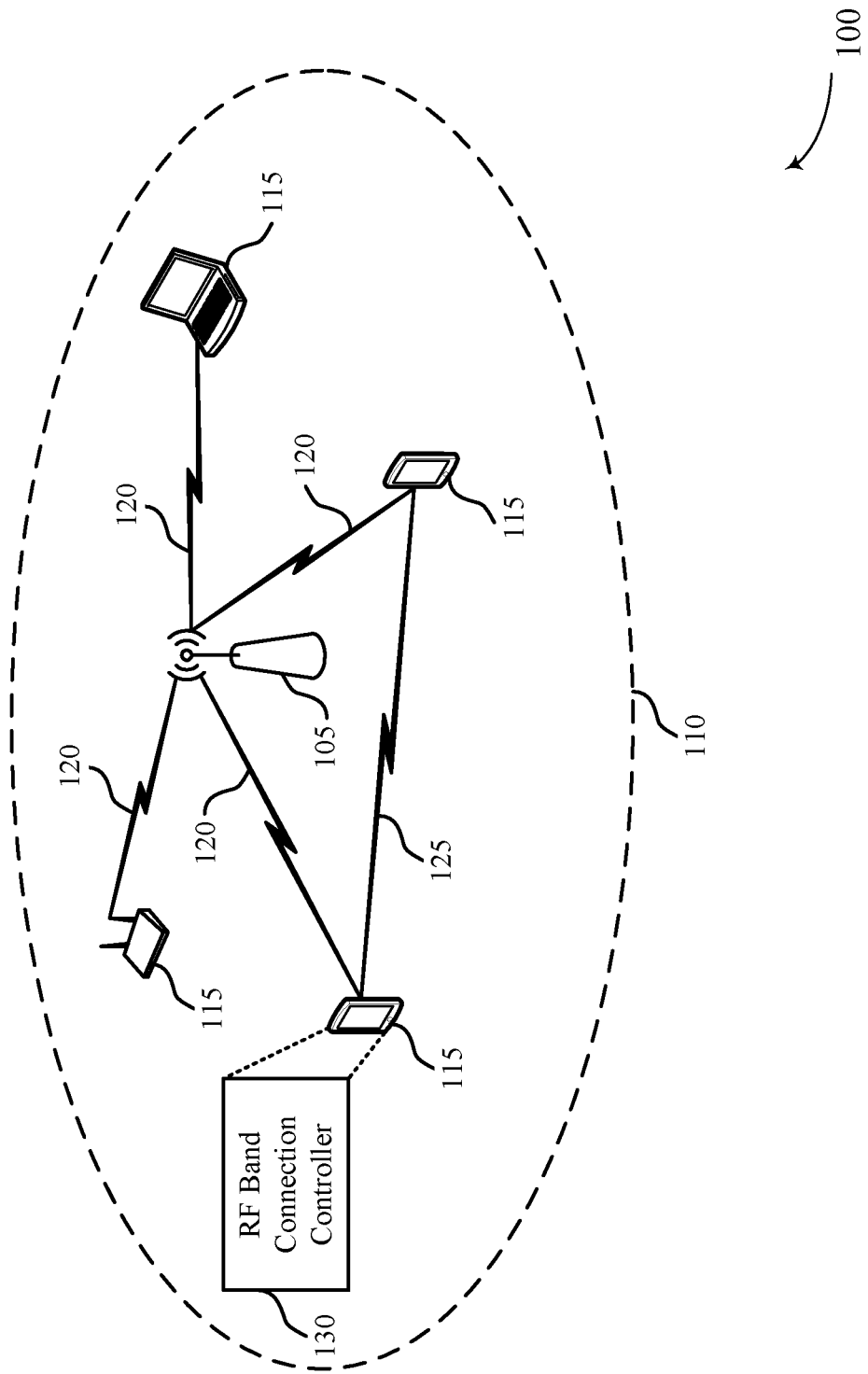
FIG. 1 shows a block diagram of a wireless communication system, in accordance with various aspects of the present disclosure.

Techniques are disclosed for providing a quick and simple mechanism for a STA having a strong connection to a wireless network using one RF band to perform scans for a more preferred RF band. Some STAs and APs support radio communications in both a 2.4 GHz band and a 5 GHz band. In such a dual-band network, the 5 GHz band may provide a higher bandwidth and support for more transmission modes than the 2.4 GHz. However, signals over the 5 GHz band signal may suffer from higher path loss than the 2.4 GHz band. As a result, an AP supporting both bands may have a smaller geographic coverage area for the 5 GHz band than the 2.4 GHz band.

When a STA enters the fringes of such a wireless network, the STA may first discover and connect to the wireless network using the 2.4 GHz band. As the STA moves closer to the AP, the signal strength of the 5 GHz band may increase to a transition point where the 5 GHz band would provide better service to the STA than the 2.4 GHz band. Nevertheless, many STAs are programmed to stop searching for service on additional bands or networks once the signal strength of the 2.4 GHz band has reached a defined roaming threshold level. Because the signal strength of the 2.4 GHz band may reach the roaming threshold well in advance of the above described transition point, the STA may not find and connect to the 5 GHz band, therefore missing the opportunity to receive the improved service offered by the 5 GHz band.

The present description generally relates to one or more improved systems, methods, apparatuses, or computer-readable media for wireless communications by a STA. The STA may identify or otherwise connect to a wireless network using a first band (e.g., a 2.4 GHz band). As the STA moves closer to the AP, the signal strength of the first band may increase to a roaming threshold level, defining the point at which the STA may generally stop scanning other bands or looking for other networks. A determination that the signal strength of the first band is greater than the roaming threshold may trigger the STA to perform a plurality of scans for support by the wireless network of a second band (e.g., a 5 GHz band). Each of these scans may occur while the signal strength of the first band is greater than the roaming threshold. If the STA detects support for the second band during one of the scans, the STA may switch from the first band to the second band. The switch may be based at least in part on a determination that the second band would provide better throughput or service than the first band, as measured or predicted by the relative signal strengths of the wireless network over each band, for example.

Techniques described herein may be used for various wireless communications systems, including systems implementing radio access technologies (RATs) such as IEEE 802.11 Wireless Local Area Network (e.g., Wi-Fi), Bluetooth, and other radio access technologies supporting multiple RF bands.

As used in the present specification, the terms "band" and "RF band" refer to a defined range of frequencies or wavelengths in an electromagnetic spectrum.

It should be understood that while the present description provides various examples of a STA scanning for and connecting to a wireless network using 2.4 GHz and 5 GHz bands for ease of explanation, the principles described herein are not limited to these specific bands. Rather, the principles of the present disclosure apply to other RF bands as well.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN 100. The WLAN 100 may include an access point (AP) 105 and wireless devices or stations (STAs) 115, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN 100 may have multiple APs 105. Each of the STAs 115, which may also be referred to as mobile stations (MSs), mobile devices, access terminals (ATs), user equipment (UE), subscriber stations (SSs), or subscriber units, may associate and communicate with an AP 105 via a communication link 120. The communication link 120 may provide wireless communications using more than one RF band. Each AP 105 may have a geographic coverage area 110 such that STAs 115 within that area can typically communicate with the AP 105. The STAs 115 may be dispersed throughout the geographic coverage area 110. Each STA 115 may be stationary or mobile.

Although not shown in FIG. 1, a STA 115 can be covered by more than one AP 105 and can therefore associate with APs 105 at different times. A single AP 105 and an associated set of stations may be referred to as a basic service set (BSS). An extended service set (ESS) is a set of connected BSSs. A distribution system (DS) (not shown) is used to connect APs 105 in an extended service set. A geographic coverage area 110 for an AP 105 may be divided into sectors making up only a portion of the coverage area (not shown). The WLAN network 100 may include APs 105 of different types (e.g., metropolitan area, home network, etc.), with varying sizes of coverage areas and overlapping coverage areas for different technologies. Although not shown, other wireless devices can communicate with the AP 105.

While the STAs 115 may communicate with each other through the AP 105 using communication links 120, each STA 115 may also communicate directly with other STAs 115 via a direct wireless link 125. Two or more STAs 115 may communicate via a direct wireless link 125 when both STAs 115 are in the AP geographic coverage area 110 or when one or neither STA 115 is within the AP geographic coverage area 110 (not shown). Examples of direct wireless links 125 may include Wi-Fi Direct connections, connections established by using a Wi-Fi Tunneled Direct Link Setup (TDLS) link, and other P2P group connections. The STAs 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections or ad hoc networks may be implemented within WLAN network 100.

The STA 115 may include a RF band connection controller 130 that may monitor, control, or otherwise implement logic, circuits, etc., to dynamically perform scans for a preferential RF band while connected to a different RF band for the STA 115. Generally, the RF band connection controller 130 may control, determine, and track which RF band the STA 115 is currently connected to. The RF band connection controller 130 may connect the STA 115 to the WLAN network 100 using a first RF band. The RF band connection controller 130 may also detect and monitor a signal strength of the first RF band. As the STA 115 approaches the AP 105, the signal strength may increase to a roaming threshold. The described techniques provide for the RF band connection controller 130 to scan for support by the WLAN network 100 of a second RF band. The STA 115 may perform multiple scans for the second RF band while the signal strength of the first RF band is greater than the roaming threshold. The RF band connection controller 130 may selectively connect to the WLAN network 100 using the second RF band if supported by the WLAN network 100. The second RF band may provide a better connection, e.g., higher bandwidth, for the STA 115 than the first RF band.

Figure 2:
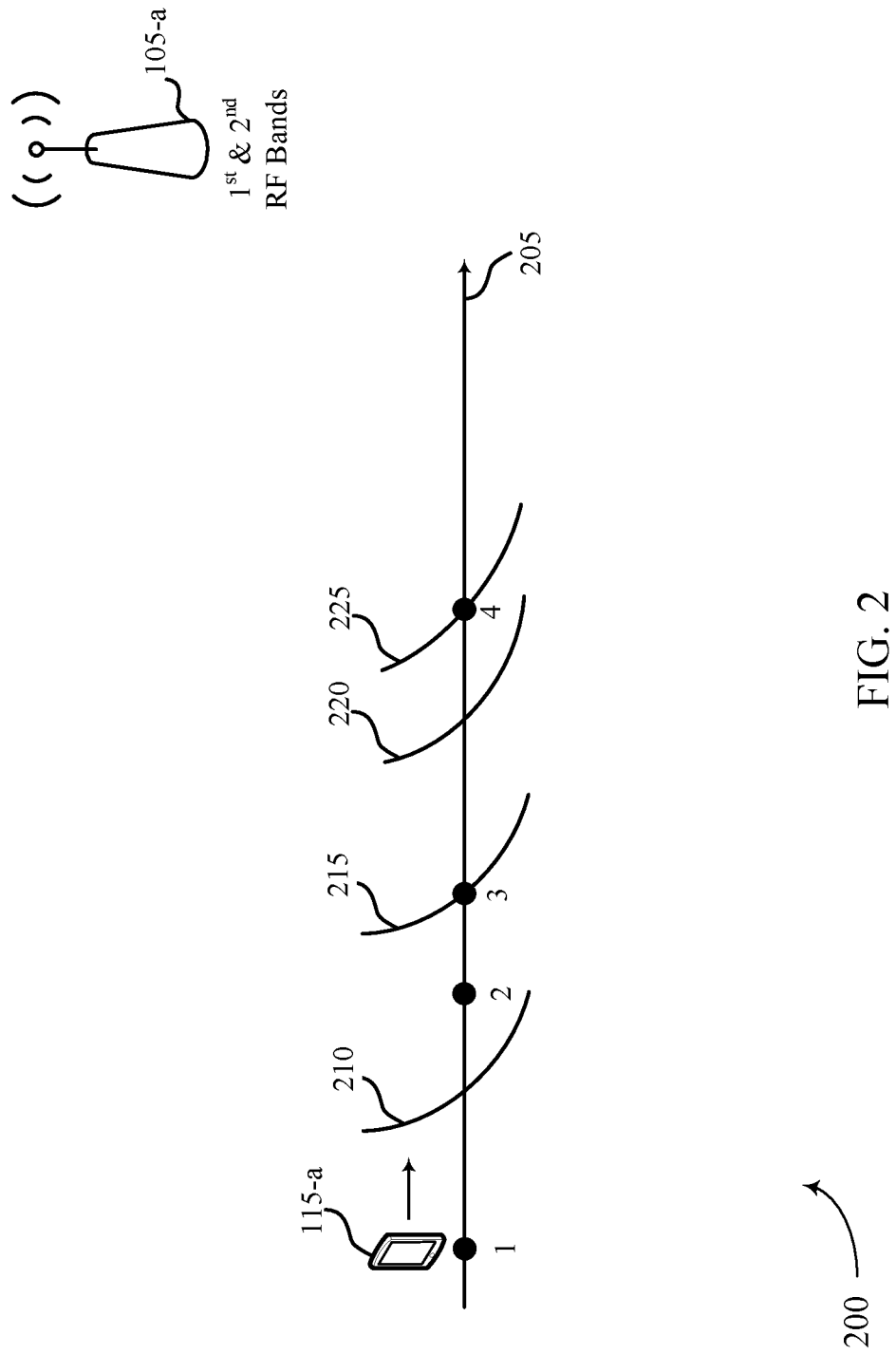
FIG. 2 shows a diagram illustrating an example of scanning for a preferred RF band in a wireless network, in accordance with various aspects of the present disclosure.

FIG. 2 shows a diagram of a wireless communications system 200 illustrating an example of scanning for a preferred RF band in a wireless network, in accordance with various aspects of the present disclosure. The wireless communications system 200 may include a STA 115-a and an AP 105-a. The STA 115-a may be an example of a STA 115 described with reference to FIG. 1. The AP 105-a may be an example of the AP 105 described with reference to FIG. 1. Generally, FIG. 2 illustrates aspects of the STA 115-a traveling along path 205 with respect to different coverage boundaries provided by the AP 105-a. The AP 105-a may support two RF bands, e.g., a first or 2.4 GHz band and a second or 5 GHz band.

The STA 115-a may begin at point 1 where the STA 115-a is out of communication range with the AP 105-a. That is, at point 1 the signal strength of the transmissions from the AP 105-a may not be strong enough to provide a reliable connection for the STA 115-a. Accordingly, the STA 115-a is not connected to the AP 105-a while at point 1. As the STA 115-a moves along path 205, it will cross coverage boundary 210. The coverage boundary 210 may represent an outer range for the first RF band supported by the AP 105-a, i.e., the range at which the signal strength of the first RF band is strong enough for the STA 115-a to connect to the wireless network provided by AP 105-a. Accordingly, when the STA 115-a reaches point 2 along path 205, the STA 115-a may connect to the AP 105-a using the first RF band. The first RF band may be a 2.4 GHz band which typically has a larger coverage area than a 5 GHz band.

As the STA 115-a continues to travel along path 205, the STA 115-a reaches a point 3 where the signal strength of the coverage boundary 215 of the first RF band reaches a roaming threshold level. Between points 2 and 3, the STA 115-a may periodically scan for a different wireless network or different RF band of the same wireless network providing a stronger signal strength. The STA 115-a may perform a scan at point 3 to determine if a different RF band is available, e.g., the second RF band. As the coverage boundary of the second RF band may not reach to point 3, the scan may indicate that the second RF band is not supported. As the STA 115-a continues to move along path 205, the STA 115-a may pass a coverage boundary 220 corresponding to a transition point where the second RF band is strong enough to provide a better connection to the STA 115-a than the connection being provided by the first RF band.

As the STA 115-a continues to move along path 205, the STA 115-a may reach a point 4 corresponding to a coverage boundary 225 associated with a signal strength of the first RF band that triggers a scan for support by the AP 105-a of the second RF band. Generally, the coverage boundary 225 may be associated with a predetermined change from the roaming threshold, e.g., a signal strength increase of 3 dBm, 5 dBm, 10 dBm, etc., from the roaming threshold. The coverage boundary 225 may be associated with fixed signal strength values, e.g., 70 dBm, 65 dBm, 60 dBm, etc., that are greater than the roaming threshold. Accordingly, at point 4 the STA 115-a may scan for support by the wireless network provided by AP 105-a of a second RF band. As point 4 is within the coverage boundary 220 where the second RF band would provide a better connection, the STA 115-a may connect to the AP 105-a using the second RF band based at least in part on the scan performed at point 4. Although FIG. 2 shows one coverage boundary 225 associated with a scan while the signal strength of the first RF band is greater than the roaming threshold, multiple coverage boundaries may be associated with multiple scans.

It should be noted that the scanning behavior of the STA 115-a prior to crossing the roaming threshold at point 3 is different from the scanning behavior of the STA 115-a after crossing the roaming threshold at point 3. Prior to crossing the roaming threshold, the STA 115-a may scan periodically (i.e., according to predefined time intervals) on all supported bands (e.g., the first band and the second band). This scanning prior to the roaming threshold may be for other wireless networks as well as support by the same wireless network over a different band than the current band. Scanning by the STA 115-a for other networks or supported bands may occur indefinitely, regardless of success, while the signal strength of the STA 115-a remains below the roaming threshold. After crossing the roaming threshold, however, the STA 115-a may exclude the first band from its scanning and focus only on the second band. The scans may be based at least in part on signal strength of the wireless network over the first band, and may be limited to a set number of unsuccessful scans.

Figure 3:
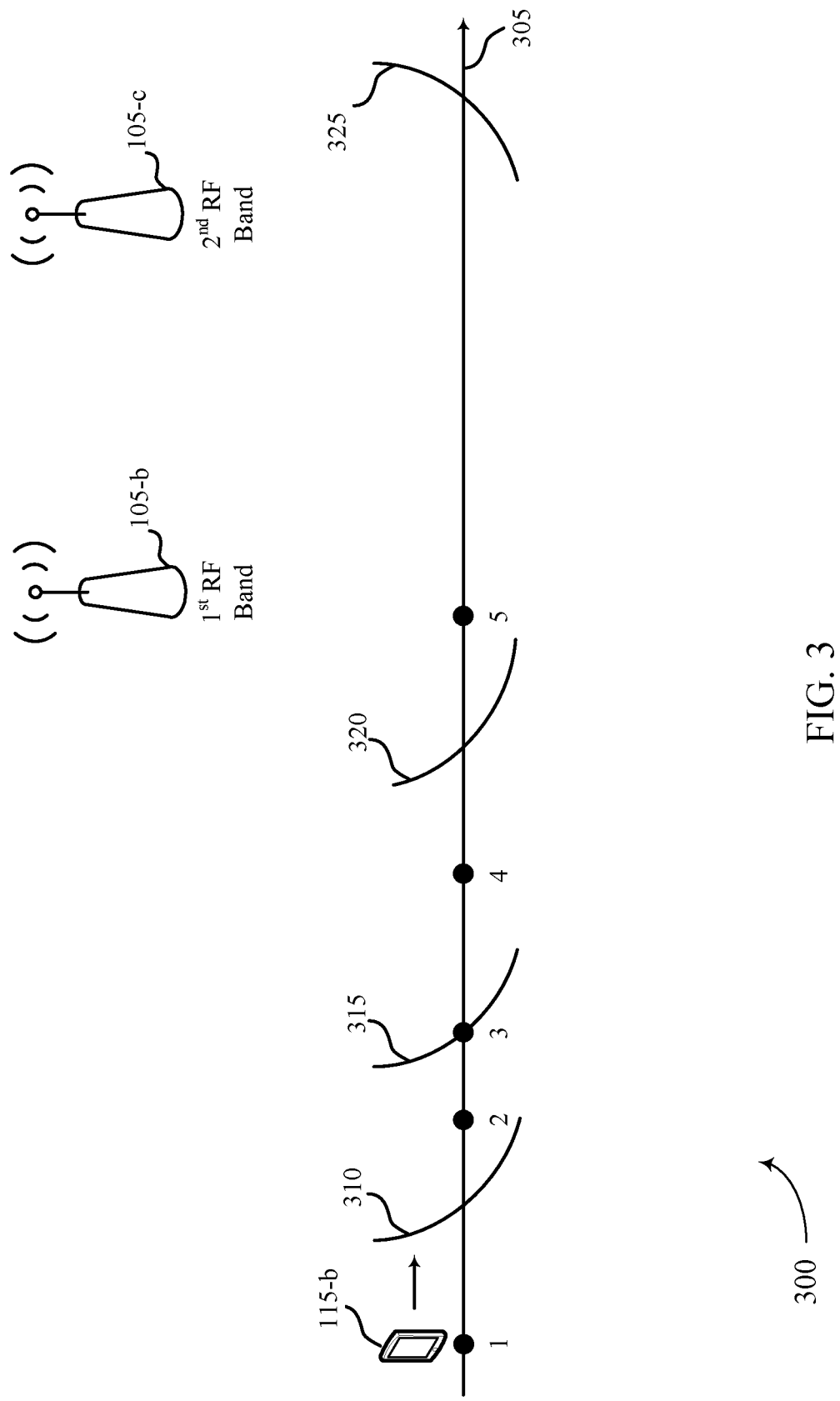
FIG. 3 shows a diagram illustrating an example of scanning for a preferred RF band in a wireless network, in accordance with various aspects of the present disclosure.

FIG. 3 shows a wireless communications system 300 illustrating an example of scanning for a preferred RF band in a wireless network, in accordance with various aspects of the present disclosure. The wireless communications system 300 may include a STA 115-*b*, an AP 105-*b*, and an AP 105-*c*. The STA 115-*b* may be an example of a STA 115 described with reference to FIG. 1. The AP 105-*b* and the AP 105-*c* may be examples of the AP 105 described with reference to FIG. 1. Generally, the wireless communications system 300 illustrates aspects of the STA 115-*b* traveling along path 305 and the associated coverage boundaries provided by the APs 105-*b* and 105-*c*. The APs 105-*b* and 105-*c* may be associated with a wireless network where the AP 105-*b* may support a first RF band, e.g., a 2.4 GHz band, and the AP 105-*c* may support a second RF band, e.g., a 5 GHz band.

The STA 115-*b* may begin at point 1 where the STA 115-*b* is out of communication range with the AP 105-*b* and the AP 105-*c*. That is, at point 1 the signal strength of the transmissions from the AP 105-*b* and AP 105-*c* may not be strong enough to provide a reliable connection for the STA 115-*b*. As the STA 115-*b* moves along path 305, the STA 115-*b* may cross a first coverage boundary 310. The coverage boundary 310 may correspond to an outer range for the first RF band as supported by the AP 105-*b*, i.e., the range at which the signal strength of the first RF band is strong enough for the STA 115-*b* to connect to the wireless network provided by AP 105-*b*. Accordingly, when the STA 115-*b* reaches point 2 along path 305, the STA 115-*b* may connect to the AP 105-*b* using the first RF band.

As the STA 115-*b* continues to travel along path 305, the STA 115-*b* reaches a point 3 where the signal strength of the coverage boundary 315 of the first RF band reaches a roaming threshold level. The coverage boundary 325 corresponds to the coverage boundary 315, but on the trailing edge of the path 305. The STA 115-*b* may perform a scan at point 3 to determine if a different RF band is available, e.g., the second RF band. As the coverage boundary of the second RF band may not reach to point 3, the scan may indicate that the second RF band is not supported. As the STA 115-*b* continues to move along path 305, it will reach a point 4 and perform an additional scan for support of the second RF band. The scan for support of the second RF band may be performed while the signal strength of the first RF band is greater than the roaming threshold. The scan performed at point 4 may be triggered by a detected signal strength of the first RF band that is at a fixed value, has increased a fixed amount with respect to the roaming threshold, etc.

As the STA 115-*b* continues to move along path 305, the STA 115-*b* may reach a coverage boundary 320 where the second RF band provided by AP 105-*c* would provide a better connection for the STA 115-*b*. Upon reaching point 5, the STA 115-*b* may perform another scan for support of the second RF band and connect to the AP 105-*c* using the second RF band based at least in part on the results of the scan. The scan at point 5 can also be triggered by a detected signal strength of the first RF band that is at a fixed value (above the roaming threshold), has increased a fixed amount with respect to the roaming threshold, etc. Accordingly, the STA 115-*b* may scan for, and connect to the wireless network using the second RF band even though the signal strength of the first RF band is greater than the roaming threshold.

As is discussed in greater detail below, the STA 115-*b* may perform scans for support of the second RF band based at least in part on a limited scan count, on a maximum signal strength of the first RF band, on a minimum signal strength level value or change, on a timing delay between scans, etc.

Figure 4:
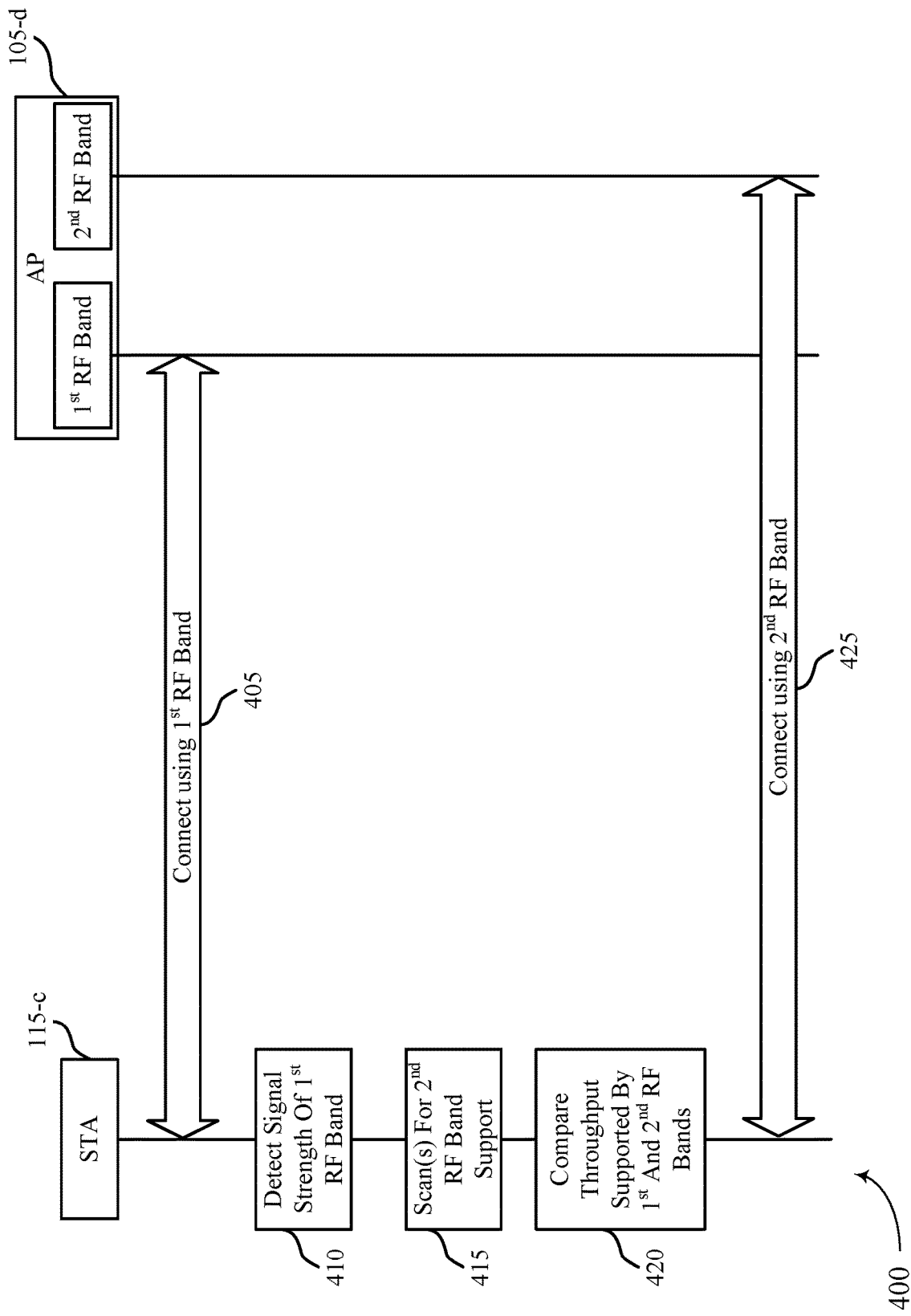
FIG. 4 illustrates an example of wireless communications between a wireless station (STA) and an access point (AP), in accordance with various aspects of the present disclosure.

FIG. 4 illustrates an example of a wireless communication 400 between a STA 115-*c* and an AP 105-*d* in accordance with various aspects of the present disclosure. The AP 105-*d* may be an example of an AP 105 described with reference to FIGS. 1-3, and the STA 115-*c* may be an example of a STA 115 described above with reference to FIGS. 1-3. The AP 105-*d* may support communications using a first RF band and a second RF band. The first RF band may be a 2.4 GHz band and the second RF band may be a 5 GHz band.

At 405, the STA 115-*c* may connect to the AP 105-*d* using the first RF band. The STA 115-*c* may enter the coverage area of the AP 105-*d* and the first RF band may provide the widest coverage area. Accordingly, the STA 115-*c* may initially connect to the wireless network using the first RF band. At 410, the STA 115-*c* may detect that the signal strength of the first RF band is greater than a roaming threshold. The roaming threshold may typically be associated with a signal strength level where the STA 115-*c* would otherwise consider the connection using the first RF band sufficient to provide a reliable connection.

At 415, the STA 115-*c* may scan the wireless network for support of a second RF band. The STA 115-*c* may scan for the second RF band while the signal strength is greater than the roaming threshold. The STA 115-*c* may perform a plurality of scans for the second RF band. Each scan may be based at least in part on a fixed signal strength level of the first RF band, on an amount of change of the signal strength of the first RF band from the roaming threshold, etc. As the STA 115-*c* may have moved closer to the AP 105-*d* and within the coverage area of the second RF band, the scan may indicate that the AP 105-*d* supports the second RF band.

Upon determining that the AP 105-*d* supports the second RF band, at 420 the STA 115-*c* compares the throughput supported by the wireless network over the first and second RF bands, respectively. The throughput for the first RF band can be based on measurements of actual traffic transmitted between the STA 115-*c* and the AP 105-*d* according to the current connection over the first RF band. The STA 115-*c* can infer or predict the throughput supported by the AP 105-*d* over second RF band prior to connecting over the second RF band using a known deterministic relationship between one or more observed parameters and predicted throughput.

The one or more parameters can include, for example, the signal strength of the AP 105-*d* over the second RF band, the channel bandwidth (e.g., 20 MHz, 40 MHz, 80 MHz, 160 MHz) supported by the AP 105-*d* over the second RF band, whether multiple input multiple output (MIMO) transmission techniques are employed over the second RF band, a number of spatial streams associated with the AP 105-*d* over the second RF band, an angle of arrival of a signal from the AP 105-*d* over second RF band, a number of connections associated with the AP 105-*d* over the second RF band, an amount of interference measured or detected over the second RF band, whether errors occur when receiving a beacon from the AP 105-*d* over the second RF band during the scanning, a distance between the AP 105-*d* and the STA 115-*c*, and/or other relevant parameters. At least some of the parameters can be observed or measured by the STA 115-*c* directly. Other parameters may be signaled to the STA 115-*c* by the AP 105-*d* using the existing connection over the first RF band or in a beacon transmitted over the 2nd RF band that is received by the STA 115-*c* during one of the scans.

Based on the throughputs supported by the AP 105-*d* over the first RF band and the second RF band, the STA 115-*c* may determine that a connection over the second RF band would provide a higher throughput than the current connection over the first RF band. Accordingly, at 425 the STA 115-c may connect to the wireless network using the second RF band. The STA 115-c may scan for and connect to the second RF band while the signal strength of the first RF band is greater than the roaming threshold. This may prevent the STA 115-c from sticking to the first RF band when the second RF band is available and may provide a better connection for the STA 115-c.

Figure 5:
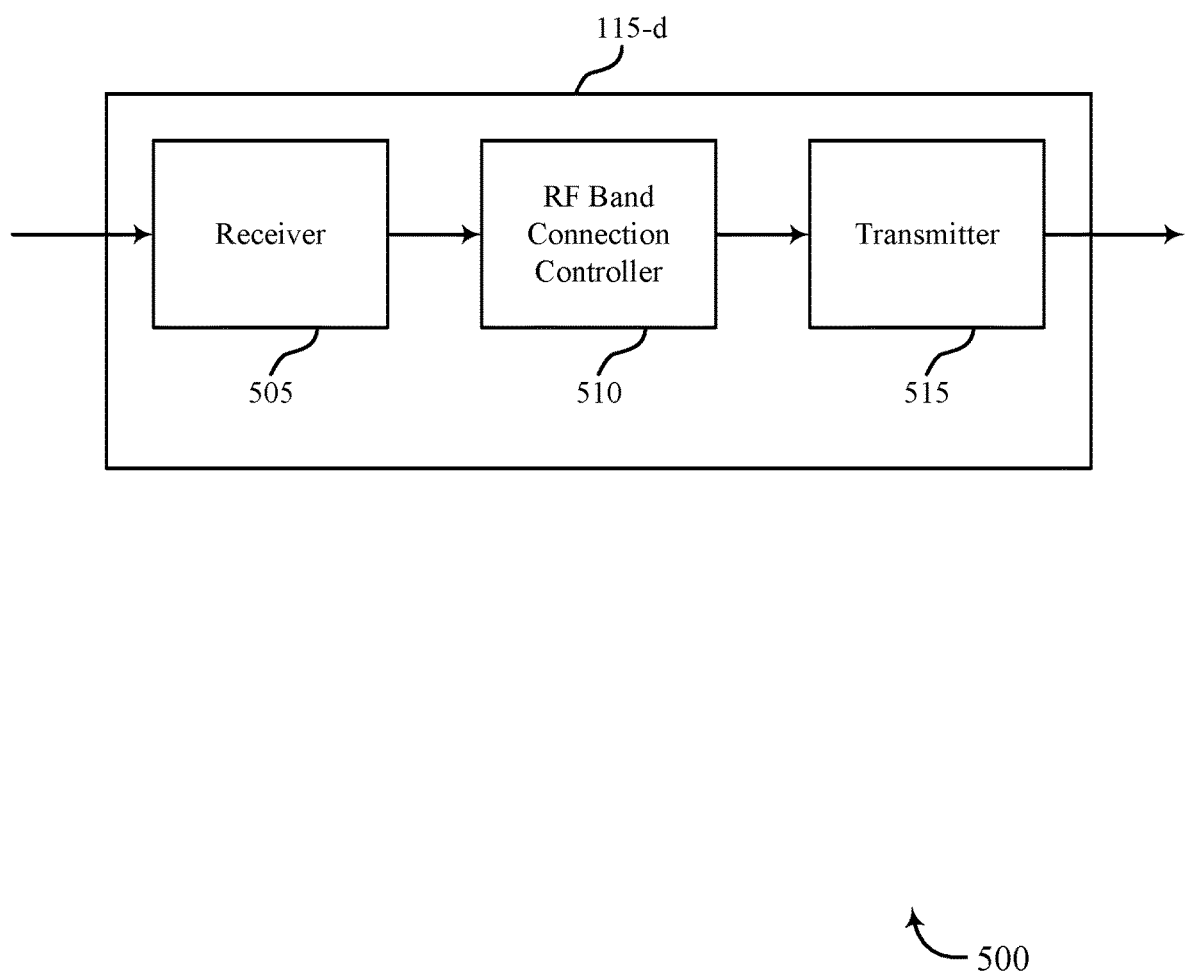
FIG. 5 shows a block diagram of an example of a STA that may be used for wireless communications, in accordance with various aspects of the present disclosure.

FIG. 5 shows a block diagram 500 of a STA 115-d configured for wireless communication, in accordance with various aspects of the present disclosure. The STA 115-d may be an example of aspects of a STA 115 described with reference to FIG. 1. The STA 115-d may include a receiver 505, a RF band connection controller 510, or a transmitter 515. The RF band connection controller 510 may be an example of the RF band connection controller 130 described with reference to FIG. 1. The STA 115-d may also include a processor. Each of these components may be in communication with each other.

The components of STA 115-d may, individually or collectively, be implemented with at least one application specific integrated circuit (ASIC) adapted to perform some or all of the applicable functions in hardware. Alternatively, the functions may be performed by other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by a general or application-specific processors.

The receiver 505 may receive information such as packets, user data, or control information associated with various information channels (e.g., control channels, data channels, and information related to performing scans for a preferred RF band while being connected to a different RF band, etc.). Information may be passed on to the RF band connection controller 510, and to other components of STA 115-d.

The RF band connection controller 510 may monitor, manage, or otherwise control various aspects related to scanning for a preferred RF band for the STA 115-d. The STA 115-d may have an active connection established with an AP using a first RF band, e.g., 2.4 GHz band. The RF band connection controller 510 may monitor, determine, or otherwise detect a signal strength if the first RF band is greater than a roaming threshold. The RF band connection controller 510 may perform a plurality of scans for the second RF band while the signal strength of the first RF band is greater than the roaming threshold. The RF band connection controller 510 may scan for support of the second RF band while the signal strength of the first RF band is greater than the roaming threshold.

In one non-limiting example, the RF band connection controller 510 may perform the multiple scans for support of the second RF band based at least in part on a maximum scan count parameter, a change level parameter associated with the detected signal strength of the first RF band, a time delay parameter between scans, and an upper bound parameter associated with the detected signal strength of the first RF band. The RF band connection controller 510 may perform a scan of the wireless network for support of the second RF band when: (1) the detected signal strength of the first RF band has changed sufficient to satisfy the change level parameter, (2) when the detected signal strength of the first RF band is below the upper bound parameter, (3) when the detected signal strength of the first RF band is greater than the roaming threshold, (4) when the time since the last scan is greater than the time delay parameter, (5) and when the maximum scan count parameter has not been reached. Accordingly, the STA 115-d may perform a predetermined number of scans that provides detection of the second RF band but conserves battery power.

The transmitter 515 may receive information from RF band connection controller 510 and transmit signals received from other components of STA 115-d. Based at least in part on a determination that the second RF band is supported by the wireless network and a determination of a supported throughput of the wireless network over the second RF band, the RF band connection controller 510 may control the transmitter 515 and receiver 505 to connect to the wireless network using the second RF band. The transmitter 515 may be collocated with the receiver 505 in a transceiver. The transmitter 515 and receiver 505 may include a single antenna or a plurality of antennas.

Figure 6:
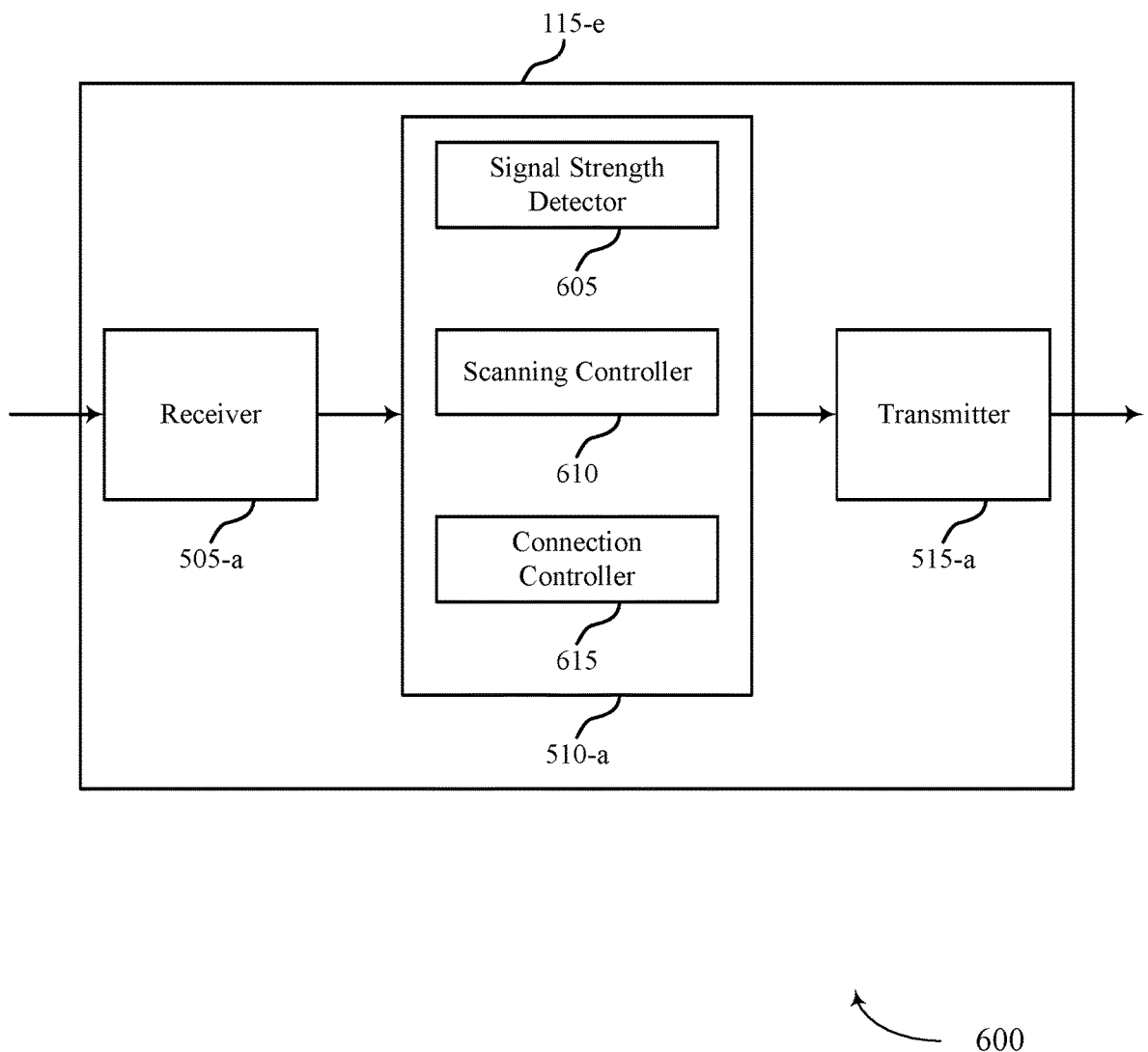
FIG. 6 shows a block diagram of another example of a STA that may be used for wireless communications, in accordance with various aspects of the present disclosure.

FIG. 6 shows a block diagram 600 of a STA 115-e configured for wireless communication, in accordance with various aspects of the present disclosure. The STA 115-e may be an example of aspects of a STA 115 described with reference to FIG. 1-4. The STA 115-e may include a receiver 505-a, a RF band connection controller 510-a, or a transmitter 515-a. The RF band connection controller 510-a may be an example of the RF band connection controller 130 or 510 described with reference to FIG. 1 or 5. The RF band connection controller 510-a may include a signal strength detector 605, a scanning controller 610, or a connection controller 615. The receiver 505-a and the transmitter 515-a may be examples of and perform similar functions as the receiver 505 and the transmitter 515, respectively, described with respect to FIG. 5. The STA 115-e may also include a processor. Each of these components may be in communication with each other.

The components of the STA 115-e may, individually or collectively, be implemented with at least one application specific integrated circuit (ASIC) adapted to perform some or all of the applicable functions in hardware. Alternatively, the functions may be performed by one or more other processing units (or cores), on at least one IC. Other types of integrated circuits may also be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Generally, the STA 115-e may have an active connection established, via the connection controller 615 alone or in combination with other components of the STA 115-e, with a wireless network using a first RF band. The first RF band may be a 2.4 GHz band.

The signal strength detector 605 may monitor, manage, or otherwise control various aspects related to detecting a signal strength of the first RF band and a second RF band for the STA 115-e. The signal strength detector 605 may detect a signal strength of the first RF band that is greater than a roaming threshold. The roaming threshold may, ordinarily, be associated with a signal strength that would indicate that the connection using the first RF band is strong enough to be considered stable and may otherwise provide a suitable connection for the STA 115-e. The signal strength detector 605 may also detect a signal strength of a second RF band, e.g., a 5 GHz band, during a scan to determine if the wireless network supports the second RF band. The signal strength detector 605 may detect the signal strength based at least in part on transmission(s) using the first or second RF bands and may include information indicative of a received signal strength indicator (RSSI), a channel quality indicator (CQI), etc.

The signal strength detector 605 may output information to the other components of the STA 115-e indicating the signal strengths of the first and second RF bands, e.g., a RSSI value for the respective RF band.

The scanning controller 610 may also monitor, manage, or otherwise determine when to scan for a connection for the STA 115-e. The scanning controller 610 may scan for support by a wireless network of a second RF band in response to the detected signal strength of the first RF band being greater than the roaming threshold. The scanning controller 610 may perform multiple scans for support of the second RF band.

The scanning controller 610 may scan for support of the second RF band based at least in part on an instantaneous signal strength of the first RF band. For example, the scanning controller 610 may scan for support of the second RF band based at least in part on fixed signal strength levels that are greater than the roaming threshold, e.g., at 70 dBm, at 65 dBm, etc. Other fixed values may also be used to trigger scanning for the support of the second RF band.

The scanning controller 610 may scan for support of the second RF band based at least in part on a detected threshold change of the signal strength of the first RF band. For example, the scanning controller 610 may scan for support of the second RF band at instances where the detected signal strength changes by a set value, e.g., every 3 dBm, every 5 dBm, every 10 dBm, etc. Other threshold change values may also be used to trigger scanning for support of the second RF band.

The scanning controller 610 may limit the number of scans based at least in part on a scan count constraint parameter. For example, while the detected signal strength of the first RF band is greater than the roaming threshold, the scanning controller 610 may use the scan count constraint parameter to limit the number of scans for support of the second RF band to reduce any impact of power consumption.

The scanning controller 610 may use a scan delay period to define when a scan is initiated. The scan delay period may be a time period that is required between scans for support of the second RF band.

The scanning controller 610 may, alone or in cooperation with the signal strength detector 605, identify an upper signal strength level of the first RF band. The upper signal strength level may be a level at which the RF band connection controller 510-a refrains from scanning for support of the second RF band. Generally, the scanning controller 610 may initiate the scan(s) when the detected signal strength of the first RF band is between the roaming threshold and the upper signal strength level. When the signal strength of the first RF band is at or above the upper signal strength level, the scanning controller 610 may refrain from initiating a scan for support of the second RF band.

The scanning controller 610 may, alone or in cooperation with the signal strength detector 605, determine that the second RF band is unsupported by the wireless network. For instance, the signal strength detector 605 may output a signal indicating that the second RF band has not been detected during the scan(s). Also, the scanning controller 610 may determine that the scan count constraint parameter has been reached, i.e., that a maximum number of scans has been performed. Accordingly, the scanning controller 610 may refrain from initiating additional scans for support of the second RF band.

The scanning controller 610 may, alone or in cooperation with the signal strength detector 605, determine that the second RF band is supported by the wireless network. For instance, the signal strength detector 605 may output a signal indicating that the second RF band has been detected during one or more scans as well as a signal strength of the second RF band.

The connection controller 615 may monitor, manage, or otherwise connect to a wireless network using a first or a second RF band for the STA 115-e. Initially, the connection controller 615 may connect to the wireless network using the first RF band. Subsequently, the connection controller 615 may, in cooperation with the signal strength detector 605 or the scanning controller 610, connect to the wireless network using the second RF band based at least in part on a scan.

The connection controller 615 may selectively connect to the network using the second RF band based at least in part on a determined throughput of the second RF band. For example, the connection controller 615 may determine that the throughput of the second RF band based at least in part on the signal strength of the second RF band. Additionally or alternatively, the throughput of the second RF band can be determined based at least in part on one or more of the following parameters: a bandwidth of the wireless network over the second RF band, a number of spatial streams associated with the wireless network over the second RF band, an angle of arrival of a signal from the wireless network over the second RF band, a number of connections associated with the wireless network over the second RF band, an amount of interference detected over the second RF band, a detected error receiving a beacon from the wireless network over the second RF band, and a distance between an access point of the wireless network and the wireless station.

The decision to the wireless network over the second RF band may be based at least in part on a determination by the connection controller 615 that throughput over the second RF band would be higher than throughput over the first RF band.

Accordingly, the signal strength detector 605, the scanning controller 610, the connection controller 615, alone or in any combination, may provide for the STA 115-e to scan for and connect to a preferred second RF band while the signal strength of the first RF band is above the roaming threshold. This may prevent the STA 115-e from sticking to the first RF band when a more preferred RF band is available, e.g., from sticking to a strong 2.4 GHz band connection when a 5 GHz band connection is available.

Figure 7A:
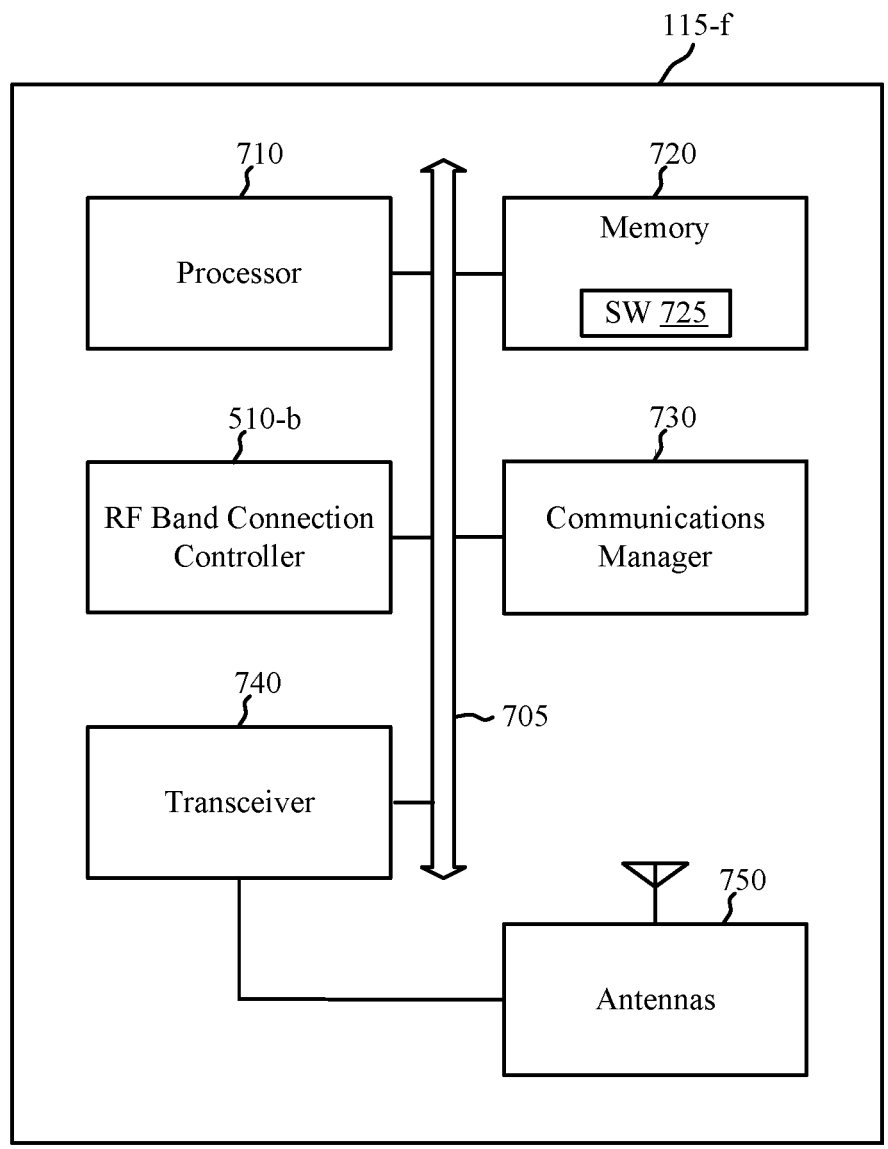
FIG. 7A shows a block diagram illustrating an example of an architecture for a STA, in accordance with various aspects of the present disclosure.

FIG. 7A shows a block diagram 700-a illustrating an example of an architecture for a STA 115-f for wireless communications, in accordance with various aspects of the present disclosure. The STA 115-f may have various configurations and may be included or be part of a personal computer (e.g., a laptop computer, netbook computer, tablet computer, etc.), a cellular telephone (e.g., a smartphone), a PDA, a digital video recorder (DVR), an internet appliance, a gaming console, an e-reader, etc. The STA 115-f may be an example of various aspects of the STA 115 described with reference to FIGS. 1-4. The STA 115-f may implement at least some of the features and functions described with reference to FIGS. 1-3. The STA 115-f may communicate with APs 105 described with reference to FIG. 4.

The STA 115-f may include a processor 710, a memory 720, a communications manager 730, a RF band connection controller 510-b, a transceiver 740, and an antenna 750.

Each of these components may be in communication with each other, directly or indirectly, over a bus 705.

The components of STA 115-*f* may, individually or collectively, be implemented with at least one application specific integrated circuit (ASIC) adapted to perform some or all of the applicable functions in hardware. Alternatively, the functions may be performed by one or more other processing units (or cores), on at least one IC. Other types of integrated circuits may also be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The memory 720 may include random access memory (RAM) or read-only memory (ROM). The processor 710 may include an intelligent hardware device, e.g., a CPU, a microcontroller, an ASIC, etc. The processor 710 may process information received through the transceiver(s) 740 or information to be sent to the transceiver(s) 740 for transmission through the antenna(s) 750. Such information may be stored in the memory 720 and accessed by the processor 710 (as well as other components, as appropriate or desired). The processor 710 may handle, alone or in connection with the communications manager 730 and the RF band connection controller 510-*b*, various aspects of scanning for a preferred RF band for the STA 115-*f*.

The transceiver(s) 740 may include a modem to modulate packets and provide the modulated packets to the antenna(s) 750 for transmission, and to demodulate packets received from the antenna(s) 750. The transceiver(s) 740 may in some cases be implemented as separate transmitters and receivers. The transceiver(s) 740 may support communications according to selected transmission mode and using more than one RF band. The transceiver(s) 740 may communicate bi-directionally, via the antenna(s) 750, with the APs 105, as described with reference to FIGS. 1-4. While the STA 115-*f* may include a single antenna 750, there may be implementations in which the STA 115-*f* may include multiple antennas 750.

The communications manager 730 may perform and control some or all of the features and functions described with reference to FIGS. 1-4 related to wireless communication utilizing a preferred RF band. For example, communications manager 730 may implement a trigger based at least in part on a detected signal strength of a first RF band to provide one or more scans of a wireless network for support of a second RF band. The communications manager 730, or portions of it, may include a processor, and some or all of the functionality of the communications manager 730 may be performed by the processor 710 or in connection with the processor 710.

The RF band connection controller 510-*b* may be an example of the RF band connection controller 130 or 510 described above with respect to FIGS. 1-6. The RF band connection controller 510-*b* may be configured to detect a signal strength of a first RF band providing a current connection and trigger one or more scans of the wireless network for support of a second RF band that may provide a better connection for the STA 115-*f*. If support for the second RF band is detected, the RF band connection controller 510-*b* determines a supported throughput of the wireless network over the second RF band using observed or signaled parameters, as described above. If the supported throughput over the second RF band is higher or otherwise more favorable than the throughput of the current connection over the second RF band, the RF band connection controller 510-*b* can trigger the transceiver 740 to connect to the wireless network over the second RF band.

Figure 7B:
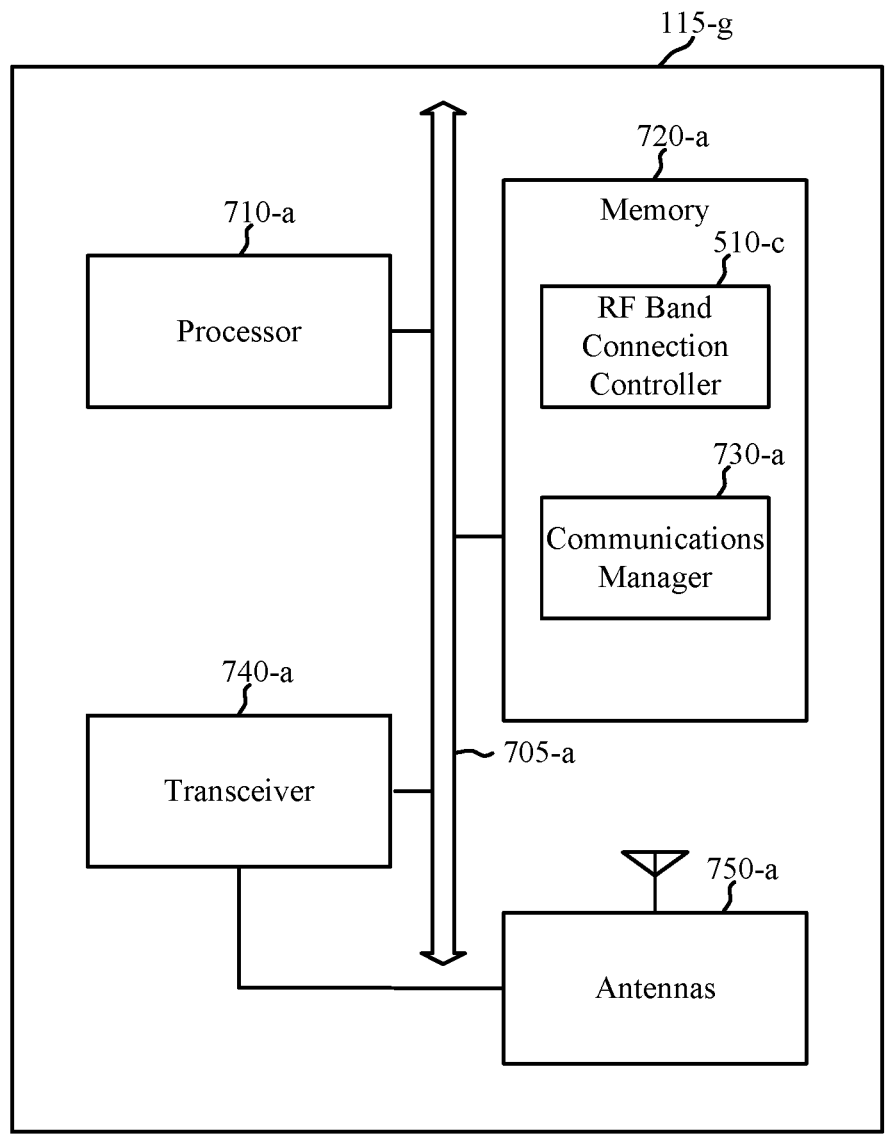
FIG. 7B shows a block diagram illustrating another example of an architecture for a STA, in accordance with various aspects of the present disclosure.

FIG. 7B shows a block diagram 700-*b* illustrating an example of an architecture for a STA 115-*g* for wireless communications, in accordance with various aspects of the present disclosure. The STA 115-*g* may have various configurations and may be included or be part of a personal computer (e.g., a laptop computer, netbook computer, tablet computer, etc.), a cellular telephone (e.g., a smartphone), a PDA, a digital video recorder (DVR), an internet appliance, a gaming console, an e-reader, etc. The STA 115-*g* may be an example of various aspects of the STAs 115 described with reference to FIGS. 1-4. The STA 115-*g* may implement at least some of the features and functions described with reference to FIGS. 1-3. The STA 115-*g* communicate with APs 105 described with reference to FIG. 4.

The components of STA 115-*g* may, individually or collectively, be implemented with at least one application specific integrated circuit (ASIC) adapted to perform some or all of the applicable functions in hardware. Alternatively, the functions may be performed by one or more other processing units (or cores), on at least one IC. Other types of integrated circuits may also be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The STA 115-*g* may include a processor 710-*a*, a memory 720-*a*, a transceiver 740-*a*, and an antenna 750-*a*. Each of these components may be in communication with each other, directly or indirectly, over a bus 705-*a*. The transceiver(s) 740-*a* and the antenna(s) 750-*a* may be configured similarly to the transceiver(s) 740 and the antenna(s) 750, respectively, described above with respect to FIG. 7A.

The memory 720-*a* may include RAM and read-only memory ROM. The processor 710-*a* may include an intelligent hardware device, e.g., a CPU, a microcontroller, an ASIC, etc. The processor 710-*a* may process information received through the transceiver(s) 740-*a* and information to be sent to the transceiver(s) 740-*a* for transmission through the antenna(s) 750-*a*. Such information may be stored in the memory 720-*a* and accessed by the processor 710-*a*. The processor 710-*a* may handle various aspects of preferred RF band scanning and connection.

The memory 720-*a* may store computer-readable, computer executable software code to implement aspects of a RF band connection controller 510-*c* or a communications manager 730-*a*. The memory 720-*a* may contain instructions that, when executed, cause the processor 710-*a* to perform various functions described herein for preferred RF band scanning and connection. Alternatively, the software code of the RF band connection controller 510-*c* or the communications manager 730-*a* may not be directly executable by the processor 710-*a* but may cause the STA 115-*g* (e.g., when compiled and executed) to perform various functions described herein.

Figure 8:
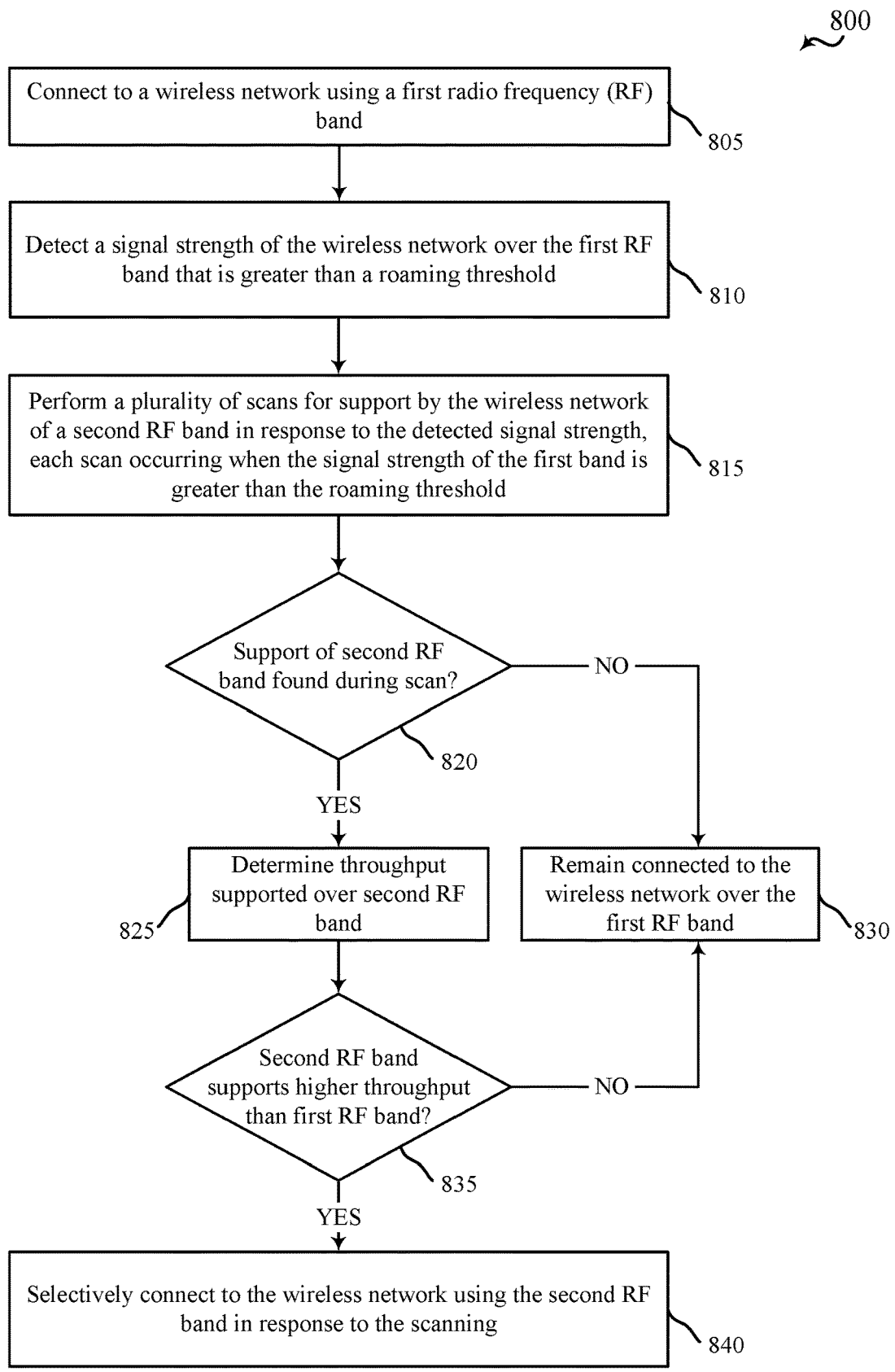
FIG. 8 is a flow chart illustrating an example of a method for wireless communication, in accordance with various aspects of the present disclosure.

FIG. 8 is a flowchart illustrating an example of a method 800 for wireless communication, in accordance with various aspects of the present disclosure. The method 800 may be performed in accordance with aspects of the STA 115 described with reference to FIGS. 1-7. For the sake of clarity, the method 800 is described with respect to a STA. The RF band connection controller 130 or 510 may perform functions to implement aspects of the method 800.

At block 805, a STA connects to a wireless network using a first RF band. The first RF band may be a 2.4 GHz band. At block 810, the STA detects a signal strength of the wireless network over the first RF band that is greater than a roaming threshold. That is, the STA may determine that the signal strength, e.g., RSSI, of the first RF band has reached the roaming threshold.

At block 815, the STA performs a plurality of scans for support by the wireless network of a second RF band. The STA may initiate each scan when the signal strength of the first RF band is greater than the roaming threshold. The STA may initiate a scan for the second RF band in response to a trigger based at least in part on a detected threshold change of the signal strength of the first RF band, etc.

If support for a second RF band is found during the scan (block 820, Yes), for example by the successful receipt and decoding of a beacon over the second RF band, the throughput supported over the second RF band may be determined at block 825. If the second RF band supports higher throughput than the current connection over the first RF band (block 835, Yes), the STA selectively connects to the wireless network using the second RF band in response to the scanning. The STA may connect to the second RF band when the scan indicates the second RF band is supported and provides a better connection that the first RF band, e.g., a higher throughput as determined based at least in part on a signal strength of the second RF band. The second RF band may be a 5 GHz band. On the other hand, if support for the second RF band is not found during the scan (block 820, No) or the second RF band supports a lower throughput than the first RF band (block 835, No), the STA may remain connected to the wireless network over the first RF band at block 830. From block 830, the method may terminate, or flow can optionally return to block 810.

Figure 9:
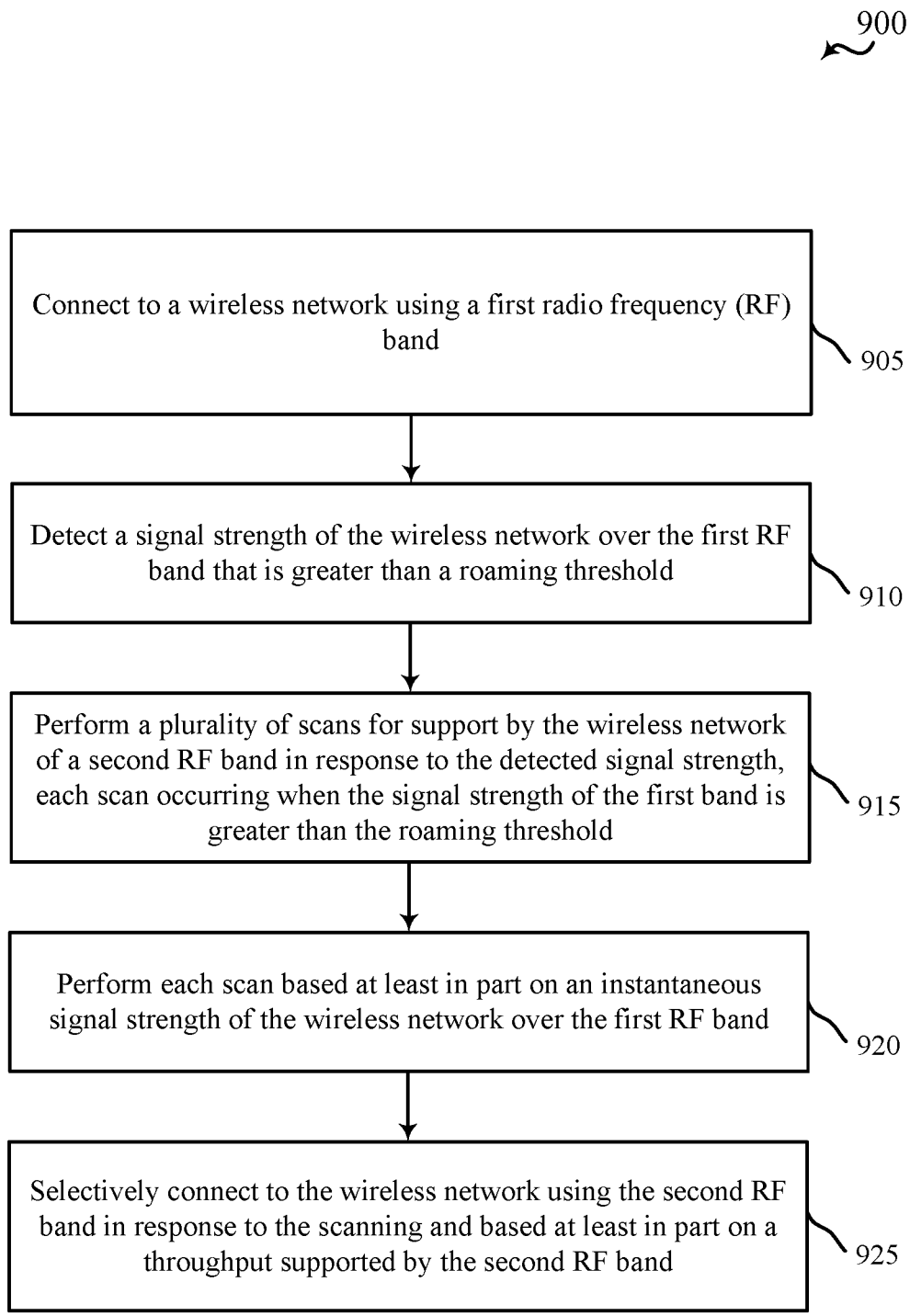
FIG. 9 is a flow chart illustrating another example of a method for wireless communication, in accordance with various aspects of the present disclosure.

FIG. 9 is a flowchart illustrating another example of a method 900 for wireless communication, in accordance with various aspects of the present disclosure. The method 900 may be performed in accordance with aspects of the STA 115 described with reference to FIGS. 1-7. For the sake of clarity, the method 900 is described with respect to a STA. The RF band connection controller 130 or 510 may perform functions to implement aspects of the method 900.

At block 905, the STA connects to a wireless network using a first RF band. The first RF band may be a 2.4 GHz band. At block 910, the STA detects a signal strength of the wireless network over the first RF band that is greater than a roaming threshold. That is, the STA may determine that the signal strength, e.g., RSSI, of the first RF band has reached the roaming threshold.

At block 915, the STA performs a plurality of scans for support by the wireless network of a second RF band. The STA may initiate each scan when the signal strength of the first RF band is greater than the roaming threshold. At block 920, the STA performs a scan based at least in part on an instantaneous signal strength of the wireless network over the first RF band. For instance, each scan may be initiated based at least in part on the detected signal strength level of the first RF band reaching a fixed RSSI value, e.g., 70 dBm, 65 dBm, etc.

At block 925, the STA selectively connects to the wireless network using the second RF band based at least in part on the scanning and a throughput supported by the network over the second RF band. The STA may connect to the second RF band when the scan indicates the second RF band is supported and provides a better connection that the first RF band, e.g., a higher throughput as determined based at least in part on a signal strength of the wireless network over the second RF band and/or another parameter, as described above.

Figure 10:
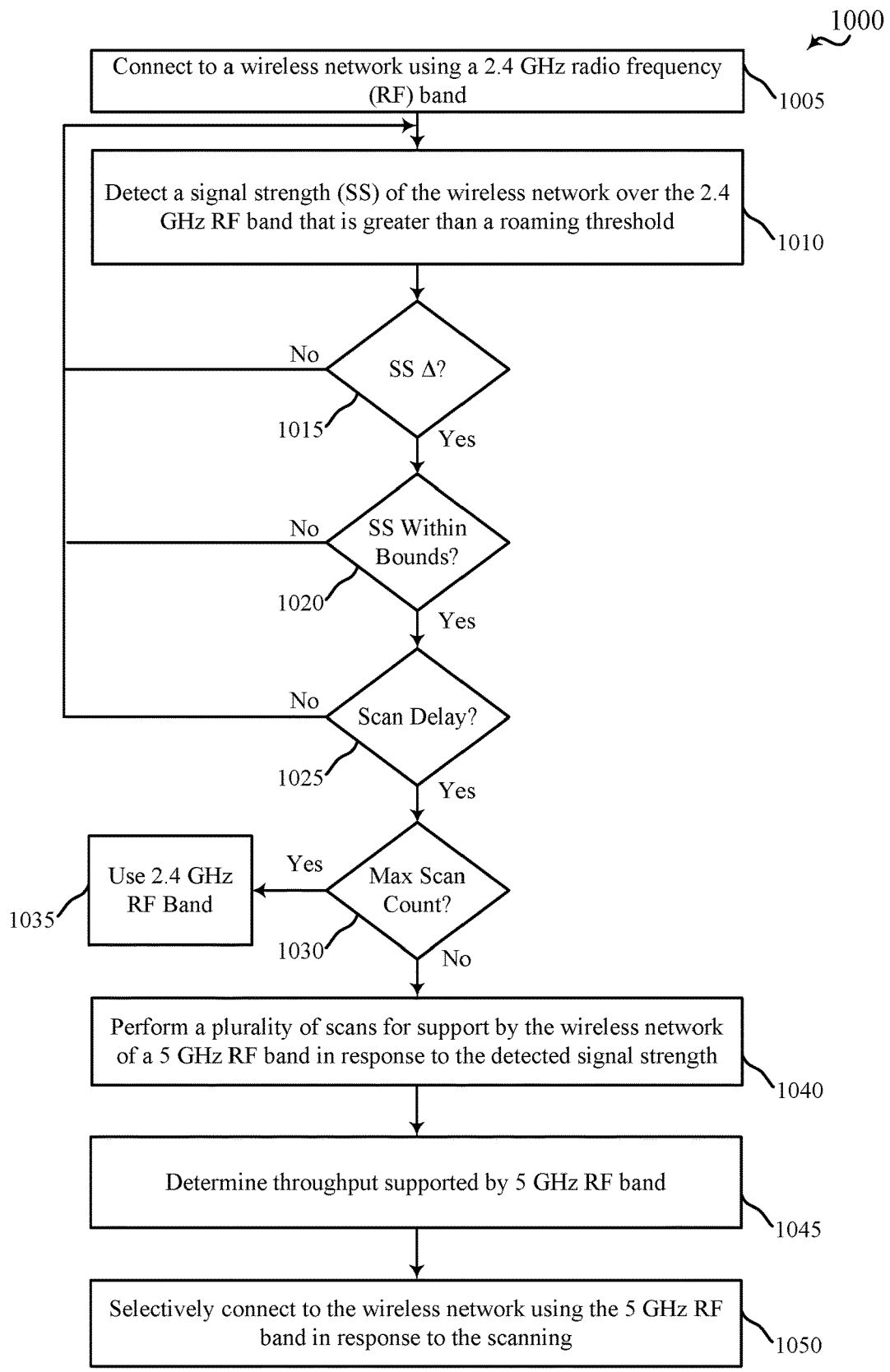
FIG. 10 is a flow chart illustrating an example of a method for wireless communication, in accordance with various aspects of the present disclosure.

FIG. 10 is a flowchart illustrating another example of a method 1000 for wireless communication, in accordance with various aspects of the present disclosure. The method 1000 may be performed in accordance with aspects of the STA 115 described with reference to FIGS. 1-7. For the sake of clarity, the method 1000 is described with respect to a STA. The RF band connection controller 130 or 510 may perform functions to implement aspects of the method 1000.

At block 1005, the STA connects to a wireless network using a 2.4 GHz band. At block 1010, the STA detects a signal strength of the wireless network over the 2.4 GHz band that is greater than a roaming threshold, e.g., greater than −76 dBm. That is, the STA may determine that the signal strength, e.g., RSSI, of the first RF band has reached the roaming threshold.

At block 1015, the STA determines whether the change (delta) in the detected signal strength satisfies a predetermined change threshold. For example, the detected signal strength may have reached a fixed or instantaneous value or may have changed a predetermined amount. If not (block 1015, No), the method 1000 may return to detecting the signal strength of the 2.4 GHz band at block 1010. If the signal strength change satisfies the predetermined change threshold (block 1015, Yes) the STA determines whether the signal strength of the 2.4 GHz band is within a boundary limit at block 1020. The boundary limit may generally be between the roaming threshold and an upper boundary limit for the 2.4 GHz band. If not (block 1020, No), the method 1000 returns to detecting the signal strength of the 2.4 GHz band at block 1010. If the signal strength of the 2.4 GHz band is within the boundary limit (block 1020, Yes), at block 1025 the STA determines whether sufficient time has elapsed since the previous scan. The scan delay time period may prevent frequent scans and conserve power. If not (block 1025, No), the method 1000 may return to detecting the signal strength of the 2.4 GHz band at block 1010.

If the scan time delay criterion has been met (block 1025, Yes), at block 1030 the STA determines whether a scan count constraint parameter has been reached. The scan count constraint parameter may provide a maximum scan count to limit the number of scans that may be performed. If the scan count constraint parameter has been reached (block 1030, Yes), at block 1035 the STA continues to use the 2.4 GHz band and refrains from performing additional scans. If the scan count constraint parameter has not been reached (block 1030, No), at block 1040 the STA performs a plurality of scans for support by the wireless network of a 5 GHz band. The STA may initiate each scan when the signal strength of the 2.4 GHz band is greater than the roaming threshold.

At block 1045, the throughput supported by the wireless network over the 5 GHz band is determined. At block 1050, the STA selectively connects to the wireless network using the 5 GHz band in response to the scanning. The STA may connect to the 5 GHz band when the scan indicates the 5 GHz band is supported and provides a better connection than the 2.4 GHz band, e.g., a higher throughput as determined based at least in part on a signal strength of the 5 GHz band and/or one or more other parameters.

The detailed description set forth above in connection with the appended drawings describes examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. Well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components (or modules) described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein, but is to be accorded the widest scope consistent with the principles and novel features disclosed herein.

What is claimed is:

1. A method for wireless communication at a wireless station, comprising:
    connecting to a wireless network using a first radio frequency (RF) band;
    performing a first plurality of scans for the first RF band and a second RF band;
    detecting a signal strength of the first RF band that is greater than a roaming threshold based at least in part on performing the first plurality of scans, the detected signal strength of the first RF band providing a reliable connection with the wireless network;
    performing a second plurality of scans for the second RF band based at least in part on the detected signal strength being greater than the roaming threshold;
    determining that a bandwidth of the wireless network over the second RF band is greater than a bandwidth of the wireless network over the first RF band based at least in part on the scanning; and
    selectively connecting to the wireless network using the second RF band while the signal strength over the first RF band is greater than the roaming threshold and provides the reliable connection with the wireless network based at least in part on the bandwidth determination.

2. The method of claim 1, wherein detecting the signal strength of the first RF band that is greater than the roaming threshold further comprises:
    detecting a received signal strength indicator (RSSI) of a transmission using the first RF band; and
    determining that the RSSI of the transmission using the first RF band is greater than the roaming threshold.

3. The method of claim 1, wherein:
    the roaming threshold corresponds to a fixed received strength indicator (RSSI) value.

4. The method of claim 1, wherein:
    the roaming threshold is a quantity of decibel-milliwatts.

5. The method of claim 1, further comprising:
    determining that the first RF band is stable based at least in part on the detected signal strength of the first RF band that is greater than the roaming threshold.

6. The method of claim 1, further comprising:
    determining that a signal strength of the second RF band exceeds the detected signal strength of the first RF band that is greater than the roaming threshold based at least in part on performing the second plurality of scans, wherein selectively connecting to the wireless network using the second RF band is based at least in part on determining that the signal strength of the second RF band exceeds the detected signal strength of the first RF band.

7. The method of claim 1, wherein:
the signal strength over the first RF band corresponds to a fixed received strength indicator (RSSI) value from the group consisting of: 60 decibel-milliwatts (dBm), 65 dBm, and 70 dBm.

8. The method of claim 1, wherein:
the roaming threshold is less than 70 decibel-milliwatts.

9. An apparatus for wireless communication, comprising:
a processor,
memory in communication with the processor, and
instructions stored in the memory and executable by the processor to cause the apparatus to:
connect to a wireless network using a first radio frequency (RF) band;
perform a first plurality of scans for the first RF band and a second RF band;
detect a signal strength of the first RF band that is greater than a roaming threshold based at least in part on performing the first plurality of scans, the detected signal strength of the first RF band providing a reliable connection with the wireless network;
perform a second plurality of scans for the second RF band based at least in part on the detected signal strength being greater than the roaming threshold
determine that a bandwidth of the wireless network over the second RF band is greater than a bandwidth of the wireless network over the first RF band based at least in part on the scanning; and
selectively connect to the wireless network using the second RF band while the signal strength over the first RF band is greater than the roaming threshold and provides the reliable connection with the wireless network based at least in part on the bandwidth determination.

10. The apparatus of claim 9, wherein the instructions are further executable by the processor to cause the apparatus to:
detect a received signal strength indicator (RSSI) of a transmission using the first RF band and determine that the RSSI of the transmission using the first RF band is greater than the roaming threshold.

11. The apparatus of claim 9, wherein:
the signal strength over the first RF band corresponds to a fixed received strength indicator (RSSI) value from the group consisting of: 60 decibel-milliwatts (dBm), 65 dBm, and 70 dBm.

12. The apparatus of claim 9, wherein:
the roaming threshold is less than 70 decibel-milliwatts.

13. The apparatus of claim 9, wherein the instructions are further executable by the processor to cause the apparatus to:
determine that the first RF band is stable based at least in part on the detected signal strength of the first RF band that is greater than the roaming threshold.

14. The apparatus of claim 9, wherein the instructions are further executable by the processor to cause the apparatus to:
determine that a signal strength of the second RF band exceeds the detected signal strength of the first RF band that is greater than the roaming threshold based at least in part on performing the second plurality of scans, wherein selectively connecting to the wireless network using the second RF band is based at least in part on determining that the signal strength of the second RF band exceeds the detected signal strength of the first RF band.

15. The apparatus of claim 9, wherein:
the first RF band comprises a 2.4 gigahertz RF band and the second RF band comprises a 5 gigahertz RF band.

16. The apparatus of claim 9, wherein:
the signal strength of the first RF band that is greater than the roaming threshold is associated with an amount of change from the roaming threshold, the amount of change comprising at least a 3 decibel-milliwatt (dBm) change from the roaming threshold, a 5 dBm change from the roaming threshold, or a 10 dBm change from the roaming threshold.

17. A method for wireless communication at a wireless station, comprising:
connecting to a wireless network using a 2.4 gigahertz (GHz) band;
determining that a signal strength of the 2.4 GHz band satisfies a roaming threshold, the signal strength of the 2.4 GHz band providing a reliable connection with the wireless network;
scanning for a 5 GHz band based at least in part on the detected signal strength of the 2.4 GHz band satisfying the roaming threshold;
determining a throughput of the 5 GHz band based at least in part on one of the group consisting of: a number of spatial streams associated with the wireless network over the 5 GHz band, an angle of arrival of a signal from the wireless network over the 5 GHz band, a number of connections associated with the wireless network over the 5 GHz band, an amount of interference detected over the 5 GHz band, an error receiving a beacon from the wireless network over the 5 GHz band, and a distance between an access point and the wireless station; and
connecting to the wireless network using the 5 GHz band while the signal strength of the 2.4 GHz band satisfies the roaming threshold and provides the reliable connection with the wireless network based at least in part on determining the throughput of the 5 GHz band.

18. The method of claim 17, wherein determining that the signal strength of the 2.4 GHz band satisfies the roaming threshold, further comprises:
detecting a received signal strength indicator (RSSI) of a transmission over the 2.4 GHz band; and
identifying that the RSSI is greater than a −76 decibel-milliwatt roaming threshold.

19. The method of claim 17, further comprising:
determining that the 2.4 GHz band is stable based at least in part on the signal strength of the 2.4 GHz band being greater than the roaming threshold.

20. The method of claim 17, further comprising:
performing a first plurality of scans for the 2.4 GHz band and the 5 GHz band;
detecting the signal strength of the 2.4 GHz based at least in part on performing the first plurality of scans; and
performing a second plurality of scans for the 5 GHz band, the second plurality of scans based at least in part on determining that the signal strength of the 2.4 GHz band satisfies the roaming threshold, wherein the scanning for the 5 GHz band is based at least in part on performing the second plurality of scans.

21. An apparatus for wireless communication at a wireless station, comprising:
a processor,
memory in communication with the processor, and instructions stored in the memory and executable by the processor to cause the apparatus to:
- connect to a wireless network using a first radio frequency (RF) band;
- detect a signal strength of the first RF band that is greater than a roaming threshold, the detected signal strength of the first RF band providing a reliable connection with the wireless network;
- scan for a second RF band based at least in part on the detected signal strength;
- determine a throughput of the second RF band based at least in part on one of the group consisting of: a number of spatial streams associated with the wireless network over the second RF band, an angle of arrival of a signal from the wireless network over the second RF band, a number of connections associated with the wireless network over the second RF band, an amount of interference detected over the second RF band, a detected error receiving a beacon from the wireless network over the second RF band, and a distance between an access point of the wireless network and the wireless station; and
- selectively connect to the wireless network using the second RF band while the signal strength over the first RF band is greater than the roaming threshold and provides the reliable connection with the wireless network based at least in part on determining the throughput of the second RF band.

22. The apparatus of claim 21, wherein the instructions are further executable by the processor to cause the apparatus to:
- detect a received signal strength indicator (RSSI) of a transmission using the first RF band and determine that the RSSI of the transmission using the first RF band is greater than the roaming threshold.

23. The apparatus of claim 21, wherein:
- the signal strength over the first RF band corresponds to a fixed received strength indicator (RSSI) value from the group consisting of: 60 decibel-milliwatts (dBm), 65 dBm, and 70 dBm.

24. The apparatus of claim 21, wherein the instructions are further executable by the processor to cause the apparatus to:
- determine that the first RF band is stable based at least in part on the detected signal strength of the first RF band that is greater than the roaming threshold.

25. The apparatus of claim 21, wherein the instructions are further executable by the processor to cause the apparatus to:
- perform a first plurality of scans for the first RF band and the second RF band, wherein detecting the signal strength of the first RF band is based at least in part on performing the first plurality of scans; and
- perform a second plurality of scans for the second RF band based at least in part on detecting the signal strength of the first RF band that is greater than the roaming threshold, wherein the scanning for the second RF band is based at least in part on performing the second plurality of scans.

26. The apparatus of claim 21, wherein the instructions are further executable by the processor to cause the apparatus to:
- determine that a signal strength of the second RF band exceeds the detected signal strength of the first RF band that is greater than the roaming threshold based at least in part on the scanning, wherein selectively connecting to the wireless network using the second RF band is based at least in part on determining that the signal strength of the second RF band exceeds the detected signal strength of the first RF band.

27. The apparatus of claim 21, wherein:
the signal strength of the first RF band that is greater than the roaming threshold is associated with an amount of change from the roaming threshold, the amount of change comprising at least a 3 decibel-milliwatt (dBm) change from the roaming threshold, a 5 dBm change from the roaming threshold, or a 10 dBm change from the roaming threshold.

* * * * *